US012754577B2

(12) United States Patent
Wu et al.

(10) Patent No.: US 12,754,577 B2
(45) Date of Patent: Oct. 6, 2026

(54) METHODS AND DEVICES FOR CONTROLLING A HIGH-VOLTAGE GENERATOR

(71) Applicant: SHANGHAI UNITED IMAGING HEALTHCARE CO., LTD., Shanghai (CN)

(72) Inventors: Jinglin Wu, Shanghai (CN); Guoping Zhu, Shanghai (CN); Bin Cao, Shanghai (CN); Xu Chu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 154 days.

(21) Appl. No.: 18/759,820

(22) Filed: Jun. 29, 2024

(65) Prior Publication Data

US 2025/0004491 A1 Jan. 2, 2025

(30) Foreign Application Priority Data

Jun. 30, 2023 (CN) ......................... 202310800655.6

(51) Int. Cl.
*G05F 1/46* (2006.01)
*H05G 1/12* (2006.01)

(52) U.S. Cl.
CPC ................. *G05F 1/46* (2013.01); *H05G 1/12* (2013.01)

(58) Field of Classification Search
CPC ................................... G05F 1/46; H05G 1/12
See application file for complete search history.

(56) References Cited

U.S. PATENT DOCUMENTS

| | | | | |
|---|---|---|---|---|
| 2005/0004564 | A1* | 1/2005 | Wham | A61B 18/1206 606/34 |
| 2006/0050538 | A1 | 3/2006 | Scheel et al. | |
| 2011/0157935 | A1* | 6/2011 | Bancroft | H02M 3/3388 363/75 |
| 2015/0032096 | A1* | 1/2015 | Johnson | A61B 18/1206 606/34 |
| 2019/0387602 | A1* | 12/2019 | Woywode | H05G 1/32 |

FOREIGN PATENT DOCUMENTS

| | | | |
|---|---|---|---|
| CN | 113391546 | B | 5/2022 |
| CN | 115996507 | A | 4/2023 |
| DE | 69631722 | T2 | 4/2005 |

OTHER PUBLICATIONS

The Extended European Search Report in European Application No. 24185401.7 mailed on May 22, 2025, 21 pages.
Partial Supplementary European Search Report in European Application No. 24185401.7 mailed on Nov. 22, 2024, 18 pages.

* cited by examiner

*Primary Examiner* — Hugh Maupin
(74) *Attorney, Agent, or Firm* — METIS IP LLC

(57) ABSTRACT

The embodiments of the present disclosure provide a method and device for controlling a high-voltage generator, the method includes: obtaining a current output voltage and a target output voltage of the high voltage generator; determining an outer loop control parameter based on the current output voltage and the target output voltage; obtaining one or more internal physical parameters of the high voltage generator; determining one or more inner loop control parameters based on the one or more internal physical parameters and the outer loop control parameter; and determining a closed loop control parameter based on the one or more inner loop control parameters to control the high voltage generator.

20 Claims, 14 Drawing Sheets

1100

METHODS AND DEVICES FOR CONTROLLING A HIGH-VOLTAGE GENERATOR

CROSS-REFERENCE TO RELATED APPLICATIONS

This application claims priority to Chinese patent application No. 202310800655.6, field on Jun. 30, 2023, the entire contents of which are incorporated herein by reference.

TECHNICAL FIELD

The present disclosure relates to a technical field of control, and in particular to methods and devices for controlling a high-voltage generator.

BACKGROUND

In a high-voltage generator of an X-ray tube, an output of the high-voltage generator not only needs to meet the regular working conditions of the system (e.g., to achieve a specified voltage value and/or a specified current value), but also needs to quickly transition from a current output state to another output state under some special circumstances (e.g., the need for rapid recovery of the output voltage after the bulb tube fires, the output voltage is quickly switched, etc.). Generally, the shorter a transition time from the current output state to another output state, the more favorable the system performance.

Therefore, it is desired to provide methods for controlling a high-voltage generator and control devices for a high-voltage generator to reduce a state switching time of the high-voltage generator.

SUMMARY

According to one or more embodiments of the present disclosure, a method for controlling a high-voltage generator is provided. The method for controlling a high-voltage generator may include: obtaining a current output voltage and a target output voltage of the high-voltage generator; determining an outer loop control parameter based on the current output voltage and the target output voltage; obtaining one or more internal physical parameters of the high-voltage generator; determining one or more inner loop control parameters based on the one or more internal physical parameters and the outer loop control parameter; and determining a closed loop control parameter based on the one or more inner loop control parameters to control the high-voltage generator.

In some embodiments, each of the one or more value ranges of the one or more inner loop control parameters may include an upper limit value of an inner loop control parameter or a lower limit value of the inner loop control parameter.

In some embodiments, the determining the one or more value ranges of the one or more inner loop control parameters may include: determining the one or more value ranges of the one or more inner loop control parameters based on a preset relationship between the one or more value ranges and the one or more inner loop control parameters and/or a preset relationship between the one or more value ranges and the target output state.

In some embodiments, the determining the one or more value ranges of the one or more inner loop control parameters may include: determining the one or more value ranges using a range determination model based on the one or more internal physical parameters or the target output state; an input of the range determination model may include the one or more internal physical parameters or the target output state, and an output of the range determination model may include the one or more value ranges corresponding to the one or more inner loop control parameters.

In some embodiments, the determining the one or more inner loop control parameters based on the one or more internal physical parameters and the outer loop control parameter may include: determining the one or more value ranges of the one or more inner loop control parameters based on the one or more internal physical parameters or the target output state; determining one or more inner loop setting values based on the one or more value ranges of the one or more inner loop control parameters and the outer loop control parameter; and determining the one or more inner loop control parameters based on the one or more inner loop setting values and the one or more internal physical parameters.

In some embodiments, the at least internal circuit module may include a plurality of internal circuit modules, at least one stage of inner loop control circuit and the plurality of internal circuit modules are coupled, and the at least one stage of inner loop control circuit may be configured to sample at least one internal physical parameter of the one or more internal physical parameters corresponding to the plurality of internal circuit modules.

In some embodiments, a plurality of inner loop control circuits may be sequentially connected in series to form multiple stages of inner loop control circuits; wherein each of the multiple stages of inner loop control circuits may be coupled and connected to one or more of the at least one internal circuit module, respectively, and the each of the plurality of inner loop control circuits may be configured to sample at least one internal physical parameter corresponding to the one or more of the at least one internal circuit module that is connected to the each of the plurality of inner loop control circuits.

In some embodiments, the multiple stages of inner loop control circuits may include a first-stage inner loop control circuit coupled to a first internal circuit module and a second-stage inner loop control circuit coupled to a second internal circuit module, the determining the one or more inner loop control parameters based on the one or more internal physical parameters and the outer loop control parameter may include: determining a first inner loop control parameter based on a first internal physical parameter corresponding to the first internal circuit module and the outer loop control parameter; and determining a second inner loop control parameter based on a second internal physical parameter corresponding to the second internal circuit module and the first inner loop control parameter; wherein the determining the closed loop control parameter based on the one or more inner loop control parameters may include: determining the closed loop control parameter based on the second inner loop control parameter.

In some embodiments, when at least one stage of inner loop control circuit of the multiple stages of inner loop control circuits is coupled to a first internal circuit module and a second internal circuit module of the high voltage generator, the determining the one or more inner loop control parameters based on the one or more internal physical parameters and the outer loop control parameter may include: determining a target physical parameter based on a first internal physical parameter corresponding to the first internal circuit module and a second internal physical parameter corresponding to the second internal circuit module; and determining an inner loop control parameter corresponding to the target physical parameter based on the target physical parameter and the outer loop control parameter.

In some embodiments, the method for controlling a high-voltage generator may further include: determining one or more of the at least one internal circuit module connected to each stage of inner loop control circuit of the multiple stages of inner loop control circuits using a circuit module determination model based on the multiple stages of inner loop control circuits and the one or more of the at least one internal circuit module.

In some embodiments, the method for controlling a high-voltage generator may further include determining a sampling physical parameter using a trained physical parameter determination model based on a preset condition.

In some embodiments, the preset condition may include preset performance parameters, and the determining the sampling physical parameter using the trained physical parameter determination model may include: determining physical parameters by inputting the preset performance parameters into the trained physical parameter determination model; and determining the sampling physical parameter based on the physical parameters.

In some embodiments, the physical parameters may include at least one of: a type of an internal physical parameter of the one or more internal physical parameters, a sequence of determination of internal physical parameters, or a sampling scheme corresponding to each of the one or more internal physical parameters.

In some embodiments, the at least one internal circuit module of the high voltage generator may include an inverter circuit, a resonance network, a voltage converter circuit, or a rectifier filter circuit that are connected in sequence, and the one or more internal physical parameters may include at least one of: an inverter current, an inverter input current, a voltage difference between bridge arms of the inverter circuit, a voltage of a series resonance capacitor of the resonance network, a primary voltage of the voltage converter circuit, or an output current of the high voltage generator.

According to one or more embodiments of the present disclosure, a control device of a high-voltage generator is provided. The control device of the high voltage generator may include: an outer loop control circuit, wherein an input end of the outer loop control circuit may be connected to an output end of the high voltage generator, and the outer loop control circuit may be configured to sample a current output voltage of the high voltage generator, and determine an outer loop control parameter based on the current output voltage and a target output voltage; at least one stage of inner loop control circuit, wherein a first input of the at least one stage of inner loop control circuit may be connected to at least one internal circuit module of the high voltage generator, a second input of a first stage of inner loop control circuit in the at least one stage of inner loop control circuit may be connected to the outer loop control circuit, a second input of any inner loop control circuit other than the first stage of inner loop control circuit, may be connected to a previous stage of inner loop control circuit; the at least one stage of inner loop control circuit may be configured to sample one or more internal physical parameters corresponding to the at least one internal circuit module, and determine one or more inner loop control parameters corresponding to the at least one internal circuit module based on the one or more internal physical parameters and the outer loop control parameter; wherein one or more value ranges of the one or more inner loop control parameters may be dynamically determined based on the one or more internal physical parameters or the target output state; wherein the control device may be configured to determine a closed loop control parameter based on the one or more inner loop control parameters to control the high voltage generator.

In some embodiments, each of the one or more value ranges of the one or more inner loop control parameters may include an upper limit value of an inner loop control parameter or a lower limit value of the inner loop control parameter.

In some embodiments, the at least one internal circuit module may include a plurality of internal circuit modules, at least one stage of inner loop control circuit and the plurality of internal circuit modules are coupled, and the at least one stage of inner loop controls circuit may be configured to sample at least one internal physical parameter of the one or more internal physical parameters corresponding to the plurality of internal circuit modules.

In some embodiments, the at least one stage of inner loop control circuit may further include multiple stages of inner loop control circuits that are sequentially connected in series; wherein each of the multiple stages of inner loop control circuits may be coupled and connected to one or more of at least one internal circuit module, respectively, to sample at least one internal physical parameter corresponding to the one or more of the at least one internal circuit module.

In some embodiments, at least one internal circuit module of the high voltage generator may include an inverter circuit, a resonance network, a voltage converter circuit, or a rectifier filter circuit that are connected in sequence, and the one or more internal physical parameters may include at least one of: an inverter current, an inverter input current, a voltage difference between bridge arms of the inverter circuit, a voltage of a series resonance capacitor of the resonance network, a primary voltage of the voltage converter circuit, or an output current of the high voltage generator.

According to one or more embodiments of the present disclosure, a non-transitory computer-readable storage medium is provided, a processor, when performing at least a portion of the computer instructions, may implement a method for controlling a high-voltage generator, comprising: obtaining a current output voltage and a target output voltage of the high voltage generator; determining an outer loop control parameter based on the current output voltage and the target output voltage; obtaining one or more internal physical parameters of the high voltage generator, wherein the one or more internal physical parameters correspond to at least one internal circuit module of the high voltage generator; determining one or more inner loop control parameters based on the one or more internal physical parameters and the outer loop control parameter, wherein one or more value ranges of the one or more inner loop control parameters are dynamically determined based on the one or more internal physical parameters or a target output state; and determining a closed loop control parameter based on the one or more inner loop control parameters to control the high voltage generator.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
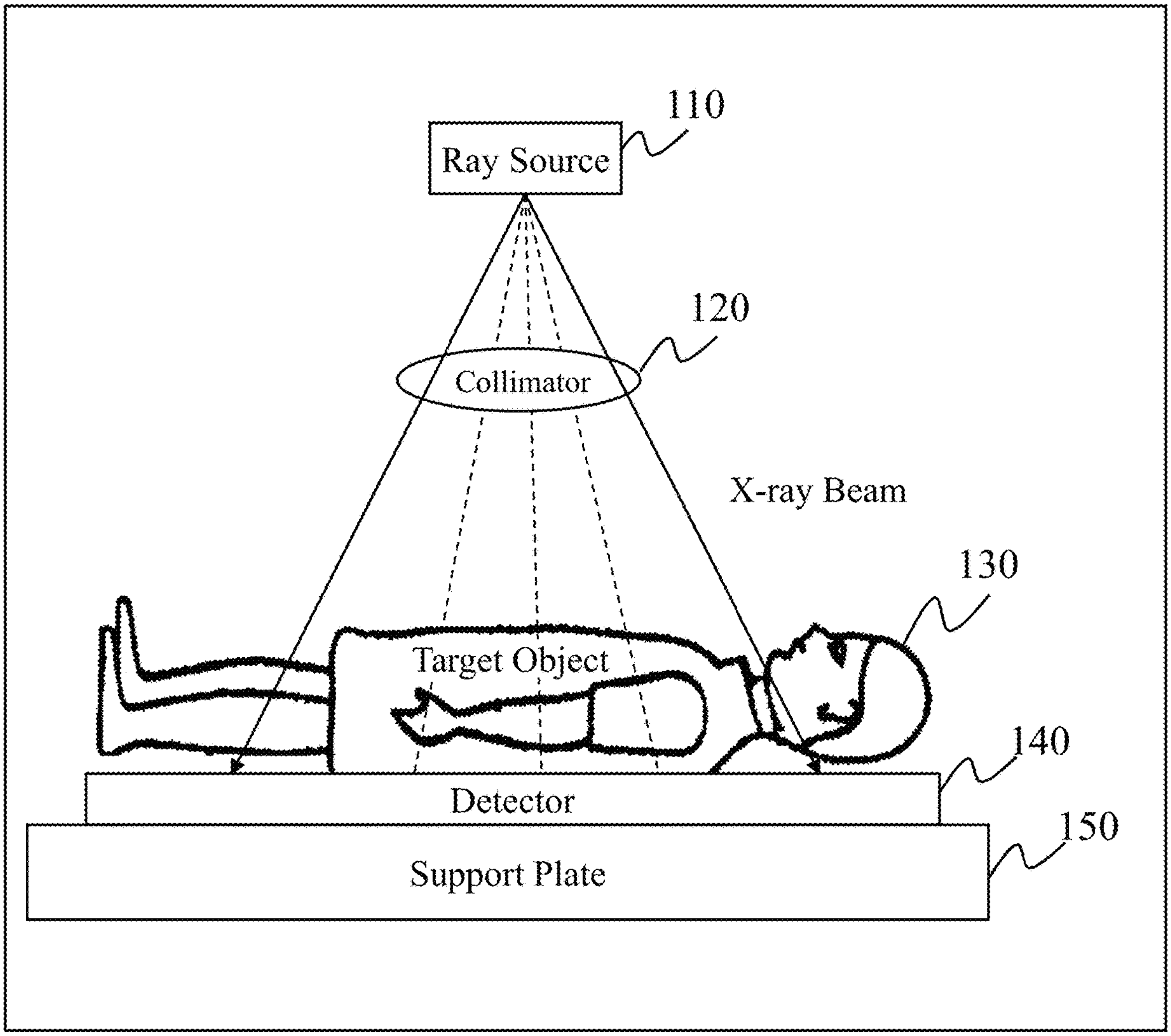
FIG. 1 is a schematic diagram illustrating an application scenario of a control device for a high-voltage generator according to some embodiments of the present disclosure.

In order to illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. Unless apparent from the locale or otherwise stated, like reference numerals represent similar structures or operations throughout the several views of the drawings.

It will be understood that the term "system," "device," "unit," and/or "module" used herein are one method to distinguish different components, elements, parts, sections, or assembly of different levels in ascending order. However, the terms may be displaced by another expression in response to determining that they achieve the same purpose.

As used in the disclosure and the appended claims, the singular forms "a," "an," "a kind of," and/or "the" may include plural forms unless the content clearly indicates otherwise. In general, the terms "comprise," "comprises," and/or "comprising," "include," "may include," and/or "including," merely prompt to include steps and elements that have been clearly identified, and these steps and elements do not constitute an exclusive listing. The methods or devices may also include other steps or elements.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an application scenario of a control device for a high-voltage generator according to some embodiments of the present disclosure.

A high-voltage generator, as a core component of an X-ray system, is used in a wide range of applications such as medical imaging testing, industrial non-destructive testing, and the security industry. FIG. 1 is an example of medical imaging testing. X-ray technology may image by passing through X-ray information of a scanned object (e.g., target object 130). In some embodiments, X-ray imaging devices may include computed tomography (CT) systems, X-ray radiography (including the use of image intensifiers, X-ray television, or X-ray cinema device), X-ray computed radiography (CR) systems, and X-ray digital radiography (DR) devices.

As shown in FIG. 1, in an X-ray imaging system, a ray source 110 may be configured to project an X-ray beam to a target object 130 that is lying flat (or in a prone position, etc.) on a support plate 150. The X-ray beam, after being confined by a collimator 120 with respect to a range of irradiation (e.g., a shape and size of the X-ray beam), may pass through the target object 130 and enter into a detector 140. A detector output signal may be generated by detecting an intensity of the X-ray beam passing through the target object 130. Based on this output signal, a medical image of the target object may be obtained through relevant processing. The target object 130 may refer to an imaging object of an X-ray imaging device. In some embodiments, the target object may be biological or non-biological. For example, the target object may include a patient, a man-made object, and the like. In some embodiments, the target object may include a particular portion of a body, such as a head, a chest, an abdomen, and the like, or any combination thereof. In some embodiments, the target object may include a specific organ, such as the heart, esophagus, trachea, bronchus, stomach, gallbladder, small intestine, colon, bladder, ureter, uterus, fallopian tube, etc., or any combination thereof. In some embodiments, the target object may include a region of interest (ROI), such as a tumor, a nodule, and the like.

As shown in FIG. 1, when imaging, rays (e.g., an X-ray beam) may be emitted from the ray source 110 (e.g., a ray tube sphere). A ray tube sphere may have a cathode side (e.g., a filament) and an anode side (e.g., a target surface). A voltage loaded between the cathode side and the anode side of the ray tube, referred to as the tube voltage, may be configured to create a high-voltage electric field so that hot electrons emitted from the filament may bombard the target surface at high speeds. The ray source 110 may be accelerated by the high-voltage electric field to excite the rays. The high-voltage generator may be configured to generate a stable high-frequency inverted direct current (referred to as DC below) high-voltage (e.g., 140 KV~150 KV) with sufficient power to be supplied to the ray tube under the control of computer instructions of the imaging system.

Merely by way of example, in the computed tomography (CT) imaging system, in the high-voltage exposure before the CT master computer instructions and before providing the required exposure parameters (such as, KV, MA, KW), the high-voltage generator receives the instructions and performs a state testing, confirms that everything is normal, and then sends high-voltage ready information to a CT host. Subsequently, the CT host gives the exposure instruction and transmits an exposure control pulse to the high-voltage generator, which starts a rotating anode, stimulates a filament current, adjusts a primary voltage of the high-voltage generator to a value of a CT-specified parameter (e.g., the specified voltage), then sends out a high-voltage generator feedback (e.g., the feedback information may be "confirm" or "OK", etc.), and starts generating a high-voltage to supply the bulb tube (i.e., the CT system ray source) for exposure. During the entire exposure period, a high-voltage primary voltage may be continuously adjusted according to the changes in current to ensure that the entire exposure process produces a smooth high-voltage pulse and a relatively constant tube current.

The high-voltage generator not only needs to output a normal working condition (for example, high-voltage generator needs to reach a specified voltage value and/or a current value) that meets the use of the system, but also needs to switch the current output state to another output state. For example, the high-voltage generator needs to rapidly restore to an output voltage after the ray tube bulb is ignited, rapidly switch an output voltage, and the like. The shorter the time spent in a state-switching process, the better the system operational performance (e.g., imaging performance).

In some embodiments, an output voltage of the high-voltage generator may be sampled by a closed loop control circuit, and a control signal (e.g., a closed loop control parameter) may be generated by an operation related to a sampled current output voltage and a target output voltage corresponding to a target output state, and an output of the high-voltage generator may be controlled based on the control signal to cause the high-voltage generator to reach the target output voltage.

Figure 2:
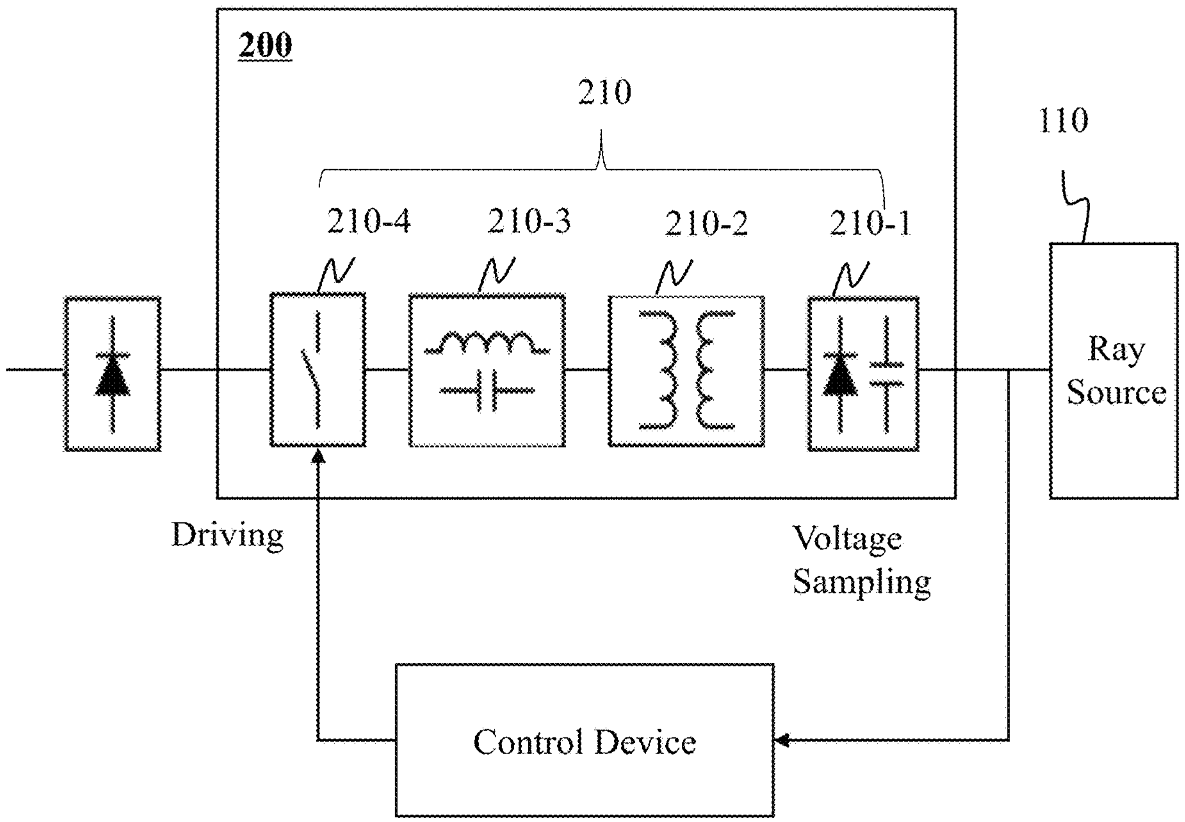
FIG. 2 is a structure diagram illustrating an exemplary high-voltage generator according to some embodiments of the present disclosure.

FIG. 2 is a structure diagram illustrating an exemplary high-voltage generator according to some embodiments of the present disclosure.

As shown in FIG. 2, an output end of the high-voltage generator 200 may be connected to the ray source 110 such that the output voltage of the high-voltage generator may act on an input high-voltage of the ray source 110 (e.g., a ray bulb).

In some embodiments, the high-voltage generator 200 may include a plurality of internal circuit modules 210 (also referred to as a main power section). In some embodiments, as shown in FIG. 2, from left to right, the plurality of internal circuit modules 210 of the high-voltage generator may include an inverter circuit 210-4, a resonance network 210-3, a voltage converter circuit 210-2, and a rectifier filter circuit 210-1 that are connected in sequence.

The inverter circuit may also be referred to as a fission circuit, for example, an inverter bridge circuit (e.g., full or half bridge circuits) composed of two or more switching tubes or an inverter bridge circuit (e.g., full or half bridge circuits) composed of switching tubes in series with a capacitor may be configured to convert an input direct current voltage into an alternating current voltage. In some embodiments, the inverter circuit may include a bipolar junction transistor switching circuit, a field effect switching circuit (MOS switching circuit), an insulated gate bipolar transistor (IGBT), a field effect transistor (FET), a field effect transistor (FET) or a metal-oxide-semiconductor field-effect transistor (MOS-FET), etc.

The resonance network may be configured to change a gain of a circuit, and assist the fission circuit in operating in a preset state according to the inverter circuit. In some embodiments, the resonance network may include a series resonance circuit or a series-parallel resonance circuit composed of inductors and/or capacitors.

The voltage converter circuit may be configured to change the voltage. For example, the voltage converter circuit may be configured to change the voltage, e.g., increase the voltage, and the voltage converter may include capacitors and/or inductors. In some embodiments, the voltage converter circuit may be provided as a transformer where the cathode and the anode are independent of each other, or as a transformer where the cathode and the anode are integrated.

The rectifier filter circuit may be configured for filtering. The rectifier filter circuit, a voltage converter circuit associated with the cathode of the ray tube, and a voltage converter circuit associated with the anode of the ray tube may be connected in parallel using the form of primary-side winding, or also be connected in series using the form of two primary-side windings.

In conjunction with the above disclosure, the output voltage of the high-voltage generator may be sampled by a control device (e.g., a closed loop control circuit) to control the output of the high-voltage generator so that the high-voltage generator may reach the target output voltage. In some embodiments, as shown in FIG. 2, the control device may form a closed loop control circuit with an input end of the high-voltage generator 200 and an output end of the high-voltage generator 200 to control conduction or cut-off of a switching device in the high-voltage generator 200, and to adjust a duty cycle and/or a variable frequency, thereby controlling the high-voltage generator 200. Different duty cycles (or switching ratios) or different frequencies may correspond to different output voltages of the high-voltage generator.

It should be noted that the above descriptions of FIGS. 1 and 2 are provided for the purpose of illustration and are not intended to limit the scope of the present disclosure. For those skilled in the art, various amendments and variations may be made according to the present disclosure. However, these amendments and variations do not depart from the scope of the present disclosure. For example, the internal circuit structure of the high-voltage generator 200 may include a first resonance branch and a second resonance branch connected to a first bridge arm of the inverter circuit and a second bridge arm of the inverter circuit, respectively.

The control device may include a single-loop control circuit and a dual-loop control circuit. The single loop control circuit may refer to a circuit that generates a control signal based only on an output voltage of the high-voltage generator. The dual loop control circuit may refer to a circuit that generates a control signal by using an output value of the outer loop control circuit corresponding to the output voltage as an inner loop setting value of the inner loop control circuit. The time taken by the high-voltage generator to switch the current output state to the target output state is related to the voltage and current stresses, etc., of the specific active and passive components of the internal circuit structure of the high-voltage generator. The single-loop control circuit may not realize an automatic protection of the voltage and the current stresses at key points inside the high-voltage generator. The double loop control circuit composed of the voltage outer loop and resonance current inner loop, merely performs a fixed limitation on the output voltage of the outer loop control circuit, that is, a maximum value of the input of the inner loop control circuit, which is difficult to play a very good protection effect in a dynamic process.

According to the embodiments of the present disclosure, a control device for a high-voltage generator (e.g., a control device 300) is provided, and the control device may include a closed loop control circuit composed of a plurality of control circuits (e.g., two or more stages of control circuits), and perform a dynamical limitation on an upper limit and lower limit of a reference value (e.g., an inner loop control parameter) of each stage of the plurality of control circuits, such that the voltage and current stresses at various critical points inside the high-voltage generator, while being protected, may fully use hardware capability, thereby compressing the switching time between different output states.

Figure 3:
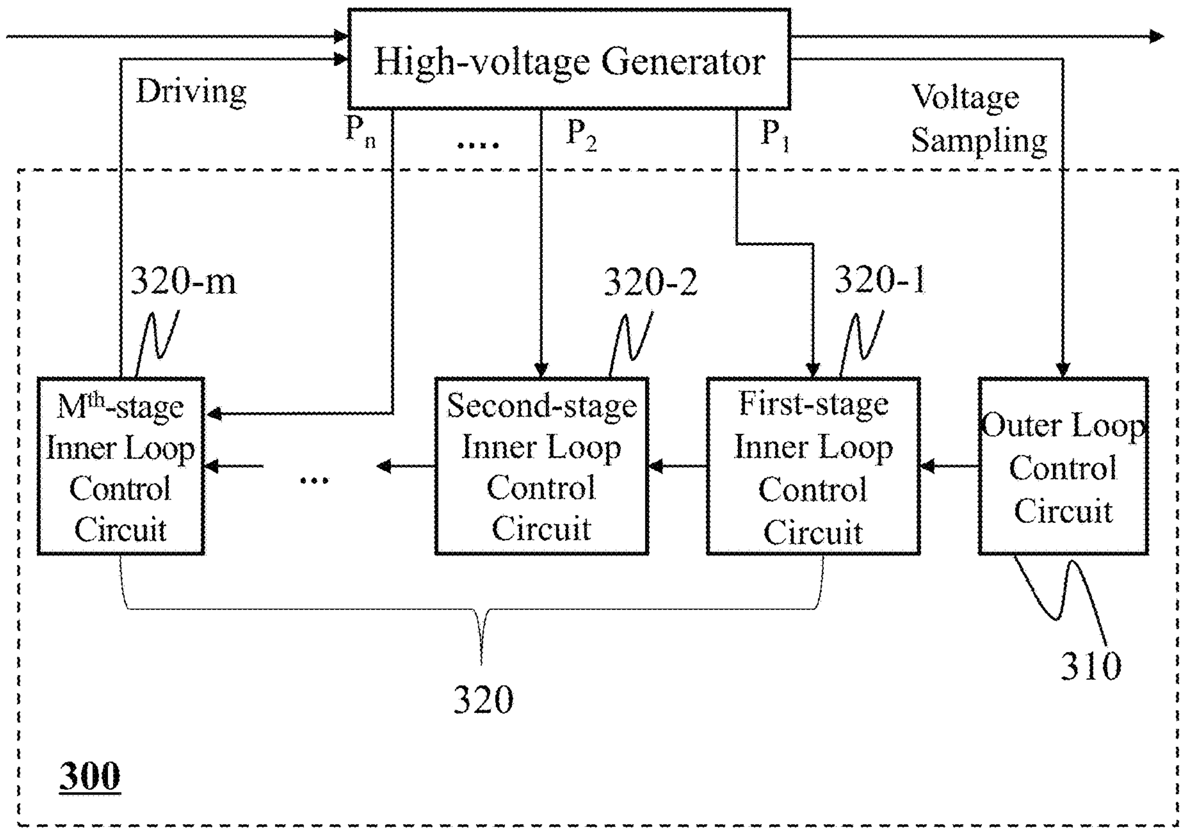
FIG. 3 is a structure diagram illustrating an exemplary control device for a high-voltage generator according to some embodiments of the present disclosure.

FIG. 3 is a structure diagram illustrating an exemplary control device for a high-voltage generator according to some embodiments of the present disclosure.

In some embodiments, as shown in FIG. 3, the control device 300 may include an outer loop control circuit 310 and an inner loop control circuit 320.

An input end of the outer loop control circuit 310 may be connected to an output end of the high-voltage generator (e.g., the high-voltage generator 200), and the outer loop control circuit may be configured to sample a current output voltage of the high-voltage generator.

Figure 6:
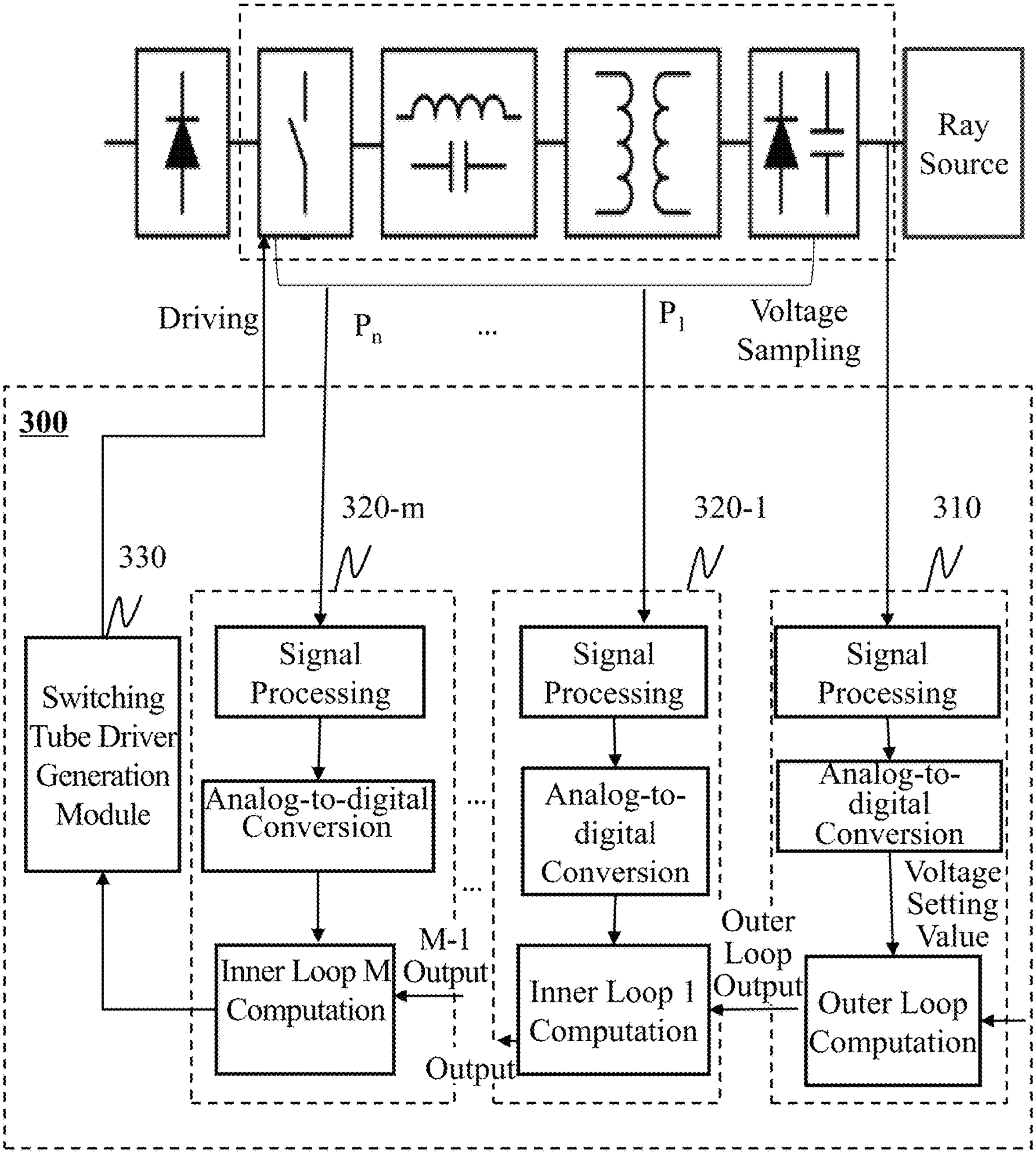
FIG. 6 is a structure diagram illustrating an exemplary high-voltage generator and a control device thereof according to some embodiments of the present disclosure.

In some embodiments, the outer loop control circuit 310 may include two inputs. One input may be connected to an output end of the high-voltage generator, and may be configured to sample the current output voltage of the high-voltage generator (e.g., an output of a rectifier filter circuit), and the other input may receive a voltage setting value. The voltage setting value of the outer loop control circuit may be an output voltage corresponding to the target output state to which the X-ray imaging system needs to be switched, referred to as a target output voltage. The outer loop control circuit 310 may determine an outer loop control parameter based on the current output voltage and the target output voltage. In some embodiments, as shown in FIG. 6, the outer loop control circuit 310 may include a signal processing module, an analog-to-digital conversion module, and an outer loop computation module. More description of the signal processing module, the analog-to-digital conversion module, and the outer loop computation module may be found in FIG. 6 and the related descriptions thereof.

The inner loop control circuit 320 may be connected to an internal circuit module of the high-voltage generator and may be configured to sample one or more internal physical parameters corresponding to the internal circuit module. The inner loop control circuit 320 may determine a corresponding inner loop control parameter of the internal circuit module based on the sampled internal physical parameters and the outer loop control parameter. The control device 300 may determine the closed loop control parameter of the high-voltage generator based on the inner loop control parameter to control the high-voltage generator.

In some embodiments, the at least internal circuit module may include a plurality of internal circuit modules. The control device 300 of the high-voltage generator may include at least one stage of inner loop control circuit coupled to the plurality of internal circuit modules. The at least one stage of inner loop control circuit may be configured to sample at least one internal physical parameter corresponding to the plurality of internal circuit modules. For example, as shown in FIG. 3, the inner loop control circuit 320 may include a first-stage inner loop control circuit 320-1, a second-stage inner loop control circuit 320-2, . . . , and an $M^{th}$-stage inner loop control circuit **320-*m*** configured to sample internal physical parameters $P_1$, $P_2$, . . . , $P_n$, where M, n is greater than or equal to one.

The internal physical parameter may refer to a physical parameter corresponding to a circuit or a network, etc., corresponding to the internal circuit module. For example, a value of an inverter current of an inverter circuit, a value of the voltage of a series resonance capacitor of the resonance network, and so on.

In some embodiments, the one or more internal physical parameters may include at least one of: an inverter current, an inverter input current, a voltage difference between bridge arms of the inverter circuit, a voltage of a series resonance capacitor of the resonance network, a primary voltage of the voltage converter circuit, or an output current of the high-voltage generator, etc.

The inverter current may refer to an input/output current at a midpoint of a bridge arm of a full-bridge circuit or a half-bridge circuit composed of inverter circuits. The midpoint of the bridge arm may be not necessarily limited to a midpoint on a physical scale, but may be any point located on a connecting line between two switching tubes (e.g., a first switching tube and a second switching tube in series). In some embodiments, when the high-voltage generator is based on a resonance circuit topology, the inverter current may refer to a resonance current.

The inverter input current, also known as a high-side current, may be a current output by a DC bus of the high-voltage generator to the inverter circuit.

The voltage of a series resonance capacitor may refer to a capacitance-voltage of a series resonance circuit or a series-parallel resonance circuit composed of inductors and/or capacitors in the high-voltage generator. For example, the voltage of the series resonance capacitor is a capacitance-voltage of a series resonance capacitor of the resonance network in FIG. 2.

A voltage difference between the bridge arms of the inverter circuit may refer to a difference between the output voltages of two sets of bridge arms of a full-bridge circuit or half-bridge circuit composed of switching tubes. For example, the full-bridge circuit may include a first bridge arm composed of a first switching tube and a second switching tube in series, a second bridge arm composed of a third switching tube and a fourth switching tube in series. The first bridge arm and the second bridge arm may be connected in parallel, and the voltage difference between the outputs of the bridge arms of the full-bridge circuit may be a voltage difference between a midpoint of the first bridge arm and a midpoint of the second bridge arm.

The primary voltage of the voltage converter circuit may refer to a primary voltage of a step-up transformer.

An output current of the high-voltage generator may refer to a current output by the high-voltage generator to a ray source (e.g., the ray source 110). The output current of the high-voltage generator may reflect a load state of the high-voltage generator.

In some embodiments, the inner loop control circuit 320 may include a sensor configured to sample the internal physical parameter (e.g., a current sensor configured to collect the current, a voltage sensor configured to collect the voltage, and the like).

In some embodiments, the internal physical parameter corresponding to the internal circuit module may include a real value or sampled value of the internal physical parameter. For example, the internal physical parameter corresponding to the resonance network may be a real value of the voltage of the series resonance capacitor of the resonance network.

In some embodiments, the control device 300 may include multiple stages of inner loop control circuits. The multiple stages of inner loop control circuits may be configured to sample one or more internal physical parameters corresponding to the internal circuit modules connected to the multiple stages of inner loop control circuits. In some embodiments, as shown in FIG. 3, the multiple stages of inner loop control circuits (e.g., M inner loop control circuits, where M is greater than or equal to 1) may be sequentially connected in series to form the multiple stages of inner loop control circuits, and a first-stage inner loop control circuit 320-1 of the multi-stage inner loop control circuit is connected in series with an outer loop control circuit 310. The first-stage inner loop control circuit 320-1 may refer to a first inner loop control circuit of the plurality of inner loop control circuits connected in series.

In some embodiments, a count (e.g., the value of M) of the inner loop control circuits and/or a hierarchical order of each stage of inner loop control circuit included in the multiple stages of inner loop control circuits may be determined using a trained inner loop circuit determination model. The hierarchical order of each stage of inner loop control circuit may refer to an order in which each stage of inner loop control circuit is connected among all the inner loop control circuits when the multiple stages of inner loop control circuits are included. For example, a large amount of sample data including different counts and/or different hierarchical orders of the inner ring control circuits may be obtained by simulation, experimentation, computational analysis, etc. A model (e.g., an inner ring circuit determination model) configured to determine the counts and/or hierarchical orders of the inner ring control circuits may be obtained by deeply learning the above sample data using artificial intelligence. For example, an extent to which different counts of inner loop control circuits affect the performance of the control device may be obtained through simulation. For example, first sample data associated with different performance requirements (e.g., the first sample data may include sample performance requirements, and counts of inner loop control circuits corresponding to different sample performance requirements) may be obtained, the trained inner loop circuit determination model may be obtained by training an initial machine learning model based on the first sample data. The training samples of the above training process may be the sample performance requirements of the first sample data, and a label of the above training process may be a count of inner loop control circuits corresponding to different sample performance requirements of the first sample data. As another example, an extent to which different counts and different hierarchical orders of inner loop control circuits affect the performance of the control device may be obtained through simulation, so that second sample data associated with different performance requirements (e.g., the second sample data may include different sample performance requirements, and the counts of inner loop control circuits corresponding to different sample performance requirements) may be obtained, the trained inner loop circuit determination model may be obtained by training the initial machine learning model based on the second sample data. The training samples of the above training process may be the sample performance requirements of the second sample data, and the labels may be the count and the hierarchical orders of the inner loop control circuits corresponding to different sample performance requirements of the second sample data. After obtaining the trained inner loop circuit determination model after the training process described above, the performance requirements of the current high-voltage generator may be input into the trained inner loop circuit determination model to obtain the count and/or hierarchical orders of inner loop control circuits output by an inner loop circuit determination model. The inner loop circuit determination model may be a machine learning model, e.g., a deep learning model, etc.

In some embodiments, each of the multiple stages of inner loop control circuits is coupled and connected to one or more of the at least one internal circuit module, respectively, and the each of the plurality of inner loop control circuits is configured to sample the at least one internal physical parameter corresponding to the one or more of the at least one internal circuit module that is connected to the each of the plurality of inner loop control circuits.

In some embodiments, each of the multiple stages of inner loop control circuits may be coupled and connected to each of the plurality of internal circuit modules, respectively. Each of the plurality of inner loop control circuits may be configured to sample the internal physical parameters corresponding to the plurality of internal circuit modules that are connected to each of the plurality of inner loop control circuits. In some embodiments, when the multiple stages of inner loop control circuits include a first-stage inner loop control circuit coupled to a first internal circuit module and a second-stage inner loop control circuit coupled to a second internal circuit module, a first input end of a first-stage inner loop control circuit may be connected to the first internal circuit module (e.g., an inverter circuit), a second input end may be connected to an output end of an outer inner loop control circuit, a first input end of a second-stage inner loop control circuit may be connected to the second internal circuit module (e.g., a resonance network), and a second input end may be connected to an output end the first-stage of inner loop control circuit.

Figure 4A:
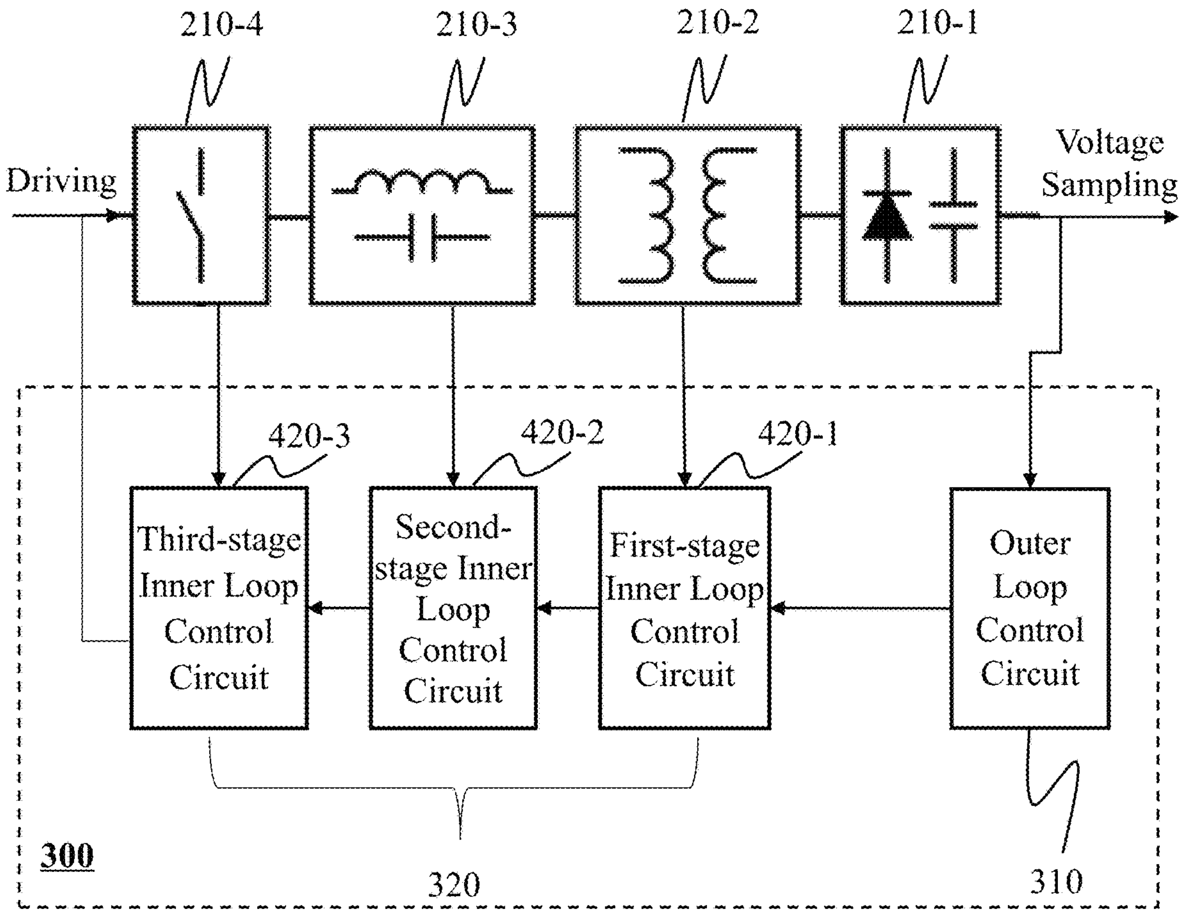
FIG. 4A is a structure diagram illustrating another exemplary control device for a high-voltage generator according to some embodiments of the present disclosure.

FIG. 4A is a structure diagram illustrating another exemplary control device for a high-voltage generator according to some embodiments of the present disclosure.

For example, as shown in FIG. 4A, multiple stages of inner loop control circuits of the control device 300 may include a first-stage inner loop control circuit 420-1, a second-stage inner loop control circuit 420-2, and a third-stage inner loop control circuit 420-3. A first input end of the first-stage inner loop control circuit 420-1 may be connected to the voltage converter circuit 210-2, and first-stage inner loop control circuit 420-1 may be configured to sample an internal physical parameter corresponding to the voltage converter circuit. A second input end may be connected to an output end of the outer loop control circuit 310. The first input end of the second-stage inner loop control circuit 420-2 may be connected to the resonance network 210-3, and the second-stage inner loop control circuit 420-2 is configured to sample an internal physical parameter corresponding to the resonance network. The second input end may be connected to the output end of the first-stage inner loop control circuit 420-1. Similarly, a first input end of the third-stage inner loop control circuit 420-3 may be connected to the inverter circuit 210-4, and may be configured to sample an internal physical parameter corresponding to the inverter circuit, and a second input end may be connected to an output end of the second-stage inner loop control circuit 420-2.

It should be understood that the inner loop control circuit 320 shown in FIG. 4A is merely provided for the purpose of example, and those skilled in the art may make various changes based thereon. For example, the inner loop control circuit may include the first-stage inner loop control circuit 420-1, the second-stage inner loop control circuit 420-2, the third-stage inner loop control circuit 420-3, and a fourth-stage inner loop control circuit. As another example, the inner loop control circuit may include the first-stage inner loop control circuit 420-1 and the second-stage inner loop control circuit 420-2. As still another example, the first-stage inner loop control circuit 420-1, the second-stage inner loop control circuit 420-2, and the third-stage inner loop control circuit 420-3 may be connected to a rectifier filter circuit, a voltage converter circuit, and a resonance network, respectively.

In some embodiments, each of the multiple stages of inner loop control circuits may be coupled and connected to each of the plurality of internal circuit modules, respectively, and the each of the plurality of inner loop control circuits may be configured to sample one or more internal physical parameters corresponding to the plurality of internal circuit modules that are connected to the each of the plurality of inner loop control circuits. For example, in conjunction with FIG. 4A, the third stage of inner loop control circuits 420-3 may be configured to sample one or more of a plurality of internal physical parameters such as inverter currents corresponding to the inverter circuits, inverter input currents, and voltage differences between bridge arms of the inverter circuits. Among other things, the different internal physical parameters may be collected and obtained by different sensors. For example, the inverter current is sampled by a first current sensor, the inverter input current is sampled by a second current sensor, and a voltage difference between the bridge arms of the inverter circuit is sampled by a voltage sensor. As another example, the second-stage inner loop control circuit 420-2 in FIG. 4A may be configured to sample the voltage of a series resonance capacitor of the resonance network corresponding to the resonance network, i.e., sampling an internal physical parameter.

In some embodiments, the control device 300 may include at least two stages of inner loop control circuits formed by at least two inner loop control circuits connected sequentially. At least one stage of inner loop control circuit of the at least two stages of inner loop control circuits may be coupled and connected to two or more first internal circuit modules of the high-voltage generator, and the at least one stage of inner loop control circuit may be configured to sample the two or more internal physical parameters corresponding to the two or more internal circuit modules that are connected to the at least one stage of inner loop control circuit. For example, the first-stage inner loop control circuit 320-1 may be coupled and connected to an inverter circuit and a resonance network, and the second-stage inner loop control circuit 320-2 may be coupled to a voltage converter circuit and a rectifier filter circuit. As another example, the first-stage inner loop control circuit 320-1 is coupled and connected to the inverter circuit and the resonance network. The second-stage inner loop control circuit 320-2 may be coupled to the voltage converter circuit, and the third-stage inner loop control circuit 320-3 may be coupled and connected to the rectifier filter circuit.

Figure 4B:
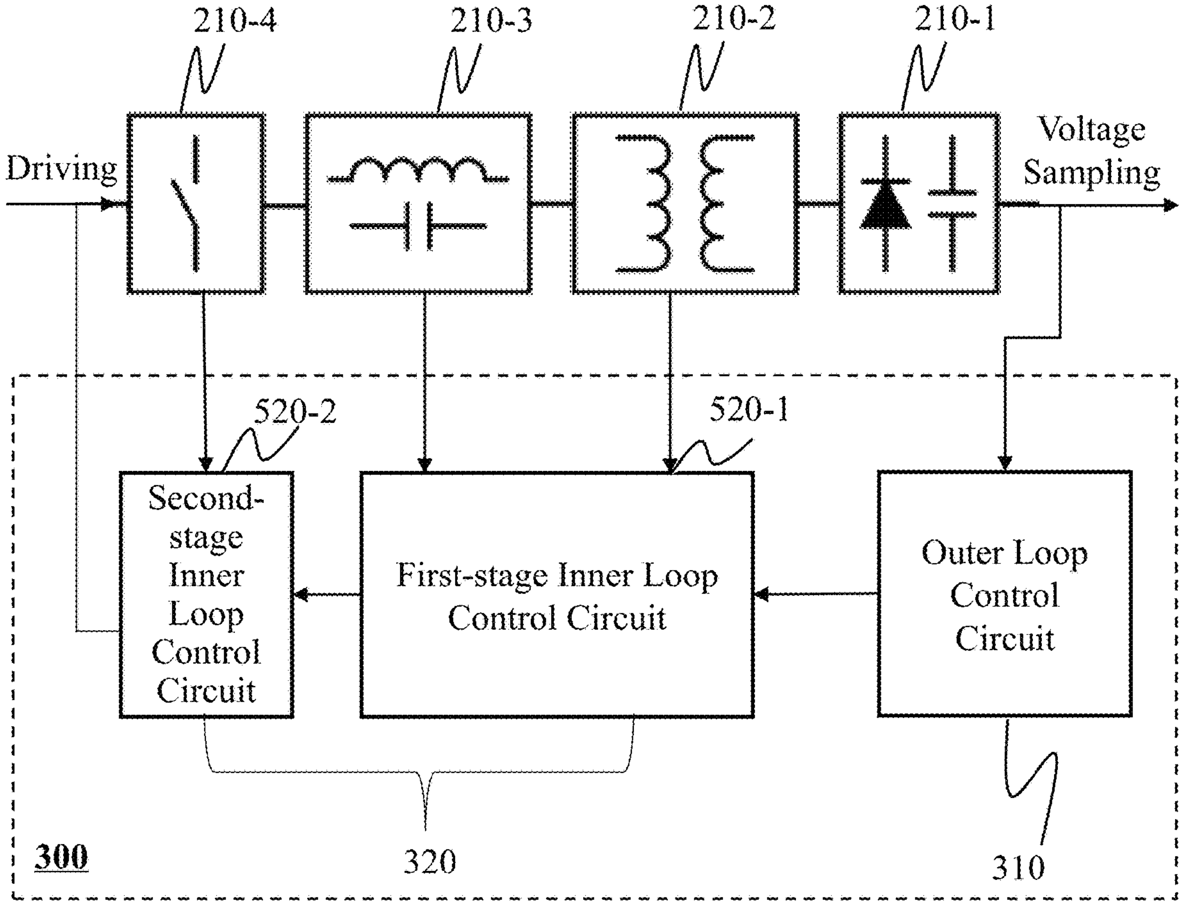
FIG. 4B is a structure diagram illustrating another exemplary control device for a high-voltage generator according to some embodiments of the present disclosure.

FIG. 4B is a structure diagram illustrating another exemplary control device for a high-voltage generator according to some embodiments of the present disclosure.

As shown in FIG. 4B, the control device 300 may include a first-stage inner loop control circuit 520-1 and a second-stage inner loop control circuit 520-2 connected in series sequentially. A first input end of the first-stage inner loop control circuit 520-1 may be connected to the voltage converter circuit 210-2 and the resonance network 210-3, and the first-stage inner loop control circuit 520-1 may be configured to sample the internal physical parameters corresponding to the voltage converter circuit 210-2 and the resonance network 210-3. For example, the internal physical parameters may include a primary voltage of the voltage converter circuit, a voltage of a series resonance capacitor of the resonance network, etc. A second input end may be connected to an output end of the outer loop control circuit 310. A first input end of the second-stage inner loop control circuit 520-2 may be connected to the inverter circuit 210-4, and the second-stage inner loop control circuit 520-2 may be configured to sample an internal physical parameter corresponding to an inverter circuit. For example, the internal physical parameter may include an inverter current, an inverter input current, a voltage difference between bridge arms of the inverter circuit, etc. The second input end may be connected to an output end of the first-stage inner loop control circuit 520-1.

In some embodiments, the control device 300 may include a stage of inner loop control circuit coupled to the plurality of internal circuit modules, and the first-stage inner loop control circuit may be configured to sample the internal physical parameters corresponding to the plurality of internal circuit modules that are connected to at least one stage of inner loop control circuit.

Figure 4C:
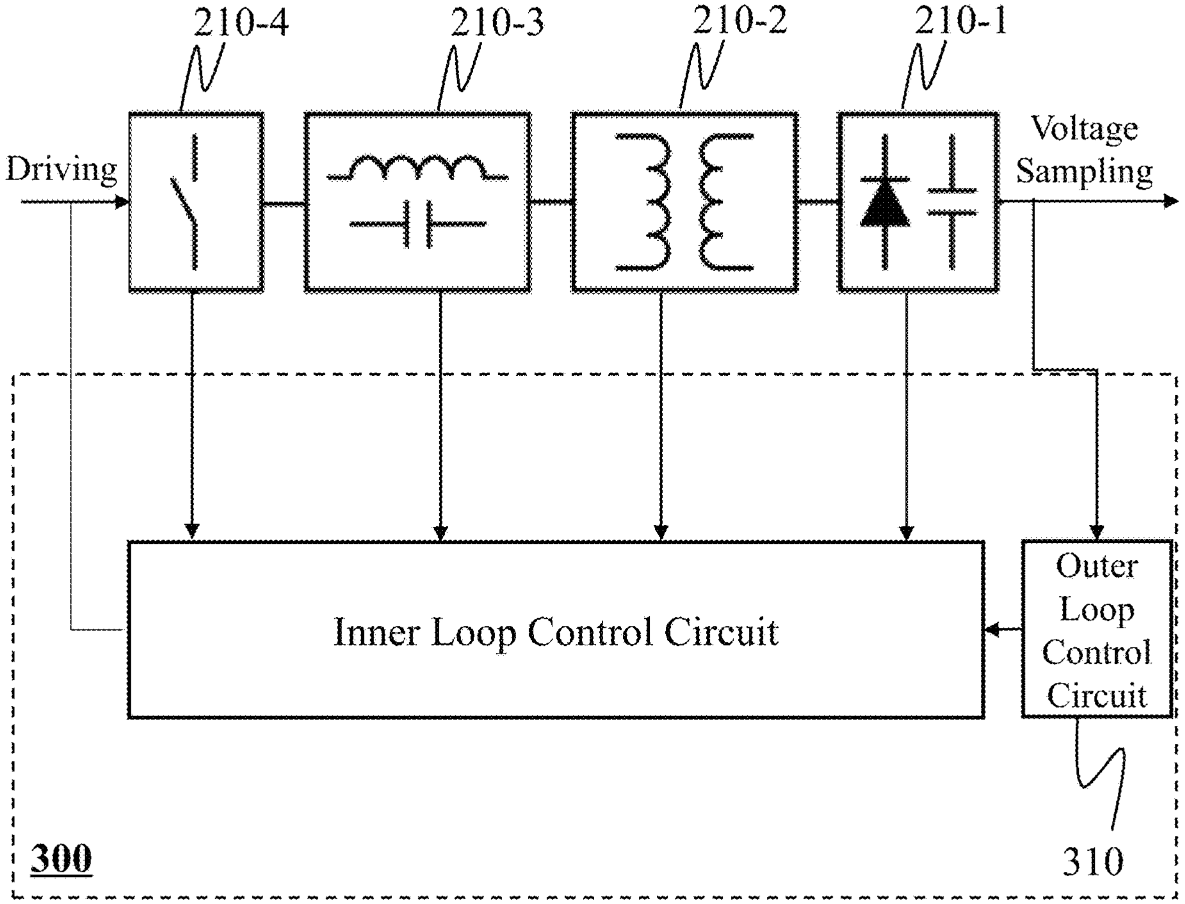
FIG. 4C is a structure diagram illustrating another exemplary control device for a high-voltage generator according to some embodiments of the present disclosure.

FIG. 4C is a structure diagram illustrating another exemplary control device for a high-voltage generator according to some embodiments of the present disclosure.

As shown in FIG. 4C, the control device 300 may include the first-stage inner loop control circuit. A first input end of the first-stage inner loop control circuit may be simultaneously connected to the rectifier filter circuit 210-1, the voltage converter circuit 210-2, the resonance network 210-3, and the inverter circuit 210-4. The first-stage inner loop control circuit may be configured to sample the internal physical parameters (e.g., an inverter current, an inverter input current, a voltage difference between bridge arms of the inverter circuit, a voltage of a series resonance capacitor of the resonance network, an output current of a high-voltage generator of the primary voltage of the voltage converter circuit, etc.) corresponding to the rectifier filter circuit 210-1, the voltage converter circuit 210-2, the resonance network 210-3, and the inverter circuit 210-4. The second input end may be connected to the output end of the outer loop control circuit 310.

In some embodiments, the first-stage inner loop control circuit coupled to two or more internal circuit modules may be configured to sample a plurality of internal physical parameters corresponding to the two or more internal circuit modules that are connected to the first-stage inner control circuit. For example, the first-stage inner loop control circuit that is coupled and connected to the resonance network and the inverter circuit may be configured to sample two or more of the plurality of internal physical parameters such as an inverter current, an inverter input current, a voltage difference between bridge arms of the inverter circuit, and a voltage of a series resonance capacitor of the resonance network.

In some embodiments, when at least one stage of inner loop control circuit is coupled to the first internal circuit module of the high-voltage generator and the second internal circuit module of the high-voltage generator, a target physical parameter may be determined based on a first internal physical parameter corresponding to the first internal circuit module and a second internal physical parameter of the second internal circuit module. The inner loop control parameter corresponding to the target physical parameter may be determined based on the target physical parameter and the outer loop control parameter. More descriptions of the above embodiments may be found in FIGS. 5A-5B and the related descriptions thereof.

In some embodiments, the control device 300 may determine one or more of the at least one internal circuit module connected to each stage of inner loop control circuit of the multiple stages of inner loop control circuits using a circuit module determination model based on the multiple stages of inner loop control circuits and the one or more of the at least one internal circuit module.

The circuit module determination model may be a machine learning model. Inputs of the circuit module determination model may include numbers of the multiple stages of inner loop control circuits (e.g., the first-stage inner loop control circuit, the second-stage inner loop control circuit, etc.) and internal physical parameters to be collected. Outputs of the circuit module determination model may include correspondences between each stage of inner loop control circuit and internal physical parameters to be collected (e.g., the first-stage inner loop control circuit may correspond to the inverter current, the second-stage inner loop control circuit may correspond to the voltage of the series resonance capacitor, and the primary voltage of the transformer, etc.).

In some embodiments, the circuit module determination model may be trained by a plurality of first training samples labeled with a first label. For example, the plurality of first training samples labeled with the first label may be input into an initial circuit module determination model. A value of a loss function may be determined by the first label, and a determination result of the initial circuit module determination model, and parameters of the initial circuit module determination model may be iteratively updated based on the value of the loss function. When the loss function of the initial circuit module determination model satisfies a preset condition for terminating the training, the model training may be completed, and such that the trained circuit module determination model may be obtained. The first training sample may include numbers of sample inner loop control circuits and sample internal physical parameters. The first training sample may be obtained based on a historical operation process of the control device of the high-voltage generator. The first label may refer to a correspondence between each stage of inner loop control circuit in the first training sample and the internal physical parameters to be collected. The first label may be determined based on manual or systematic automatic labeling. The preset condition for the end of training may be that the loss function converges (e.g., a mean square error of the loss function is less than a first error threshold), a count of iterations is equal to or less than a first number threshold, etc.

It should be understood that after determining the correspondences between each stage of inner loop control circuit and the internal physical parameters to be collected, a coupled internal circuit module respectively corresponding to each stage of inner loop circuit of the at least two stages of inner loop control circuit may be obtained based on correspondences between the internal physical parameters and two or more internal circuit modules (for example, the inverter current may correspond to the internal circuit module corresponding to the inverter circuit), and a circuit structure of the control device may be desired based thereon.

Figure 5A:
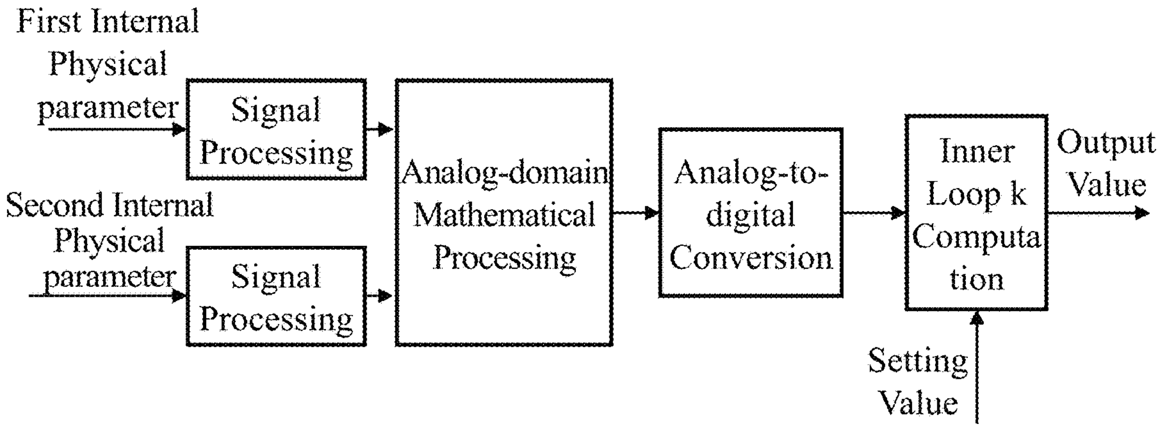
FIG. 5A is a structure diagram illustrating an exemplary inner loop control circuit according to some embodiments of the present disclosure.
Figure 5B:
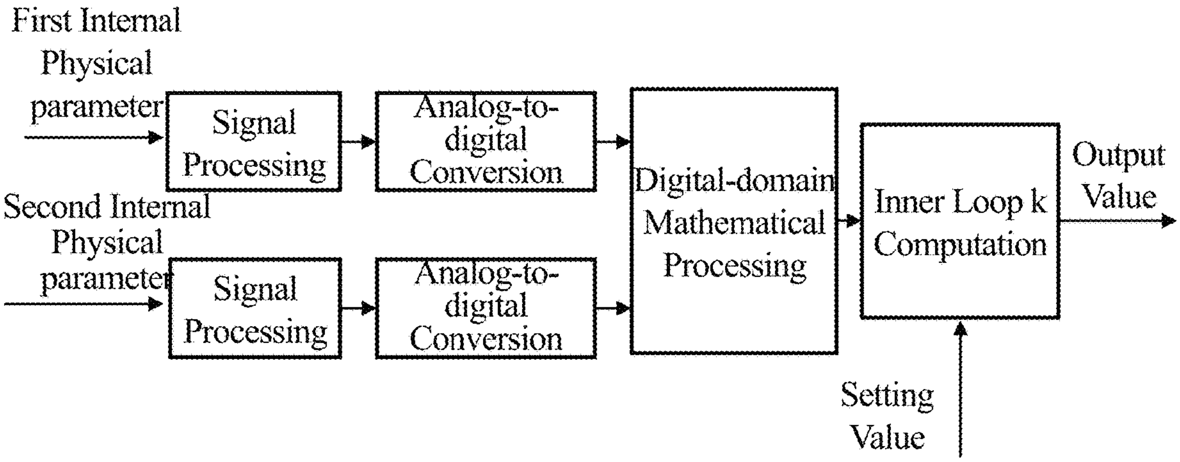
FIG. 5B is a structure diagram illustrating another exemplary inner loop control circuit according to some embodiments of the present disclosure.

FIG. 5A is a structure diagram illustrating an exemplary inner loop control circuit according to some embodiments of the present disclosure. FIG. 5B is a structure diagram illustrating another exemplary inner loop control circuit according to some embodiments of the present disclosure.

In conjunction with the above, at least one stage of inner loop control circuit may be configured to sample one or more internal physical parameters corresponding to one or more internal circuit modules that are connected to the at least one inner loop control circuit. For example, the at least one stage of inner loop control circuit that is coupled and connected to the inverter circuit may be configured to sample an inverter current and a voltage difference between bridge arms of the inverter circuit. As another example, the at least one first-stage inner loop control circuit that is coupled and connected to the resonance network may be configured to sample a voltage of a series resonance capacitor of the resonance network. As another example, the at least one inner loop control circuit that is coupled and connected to the inverter circuit and the resonance network may be configured to sample the inverter current and the voltage of the series resonance capacitor, or the voltage difference between the bridge arms of the inverter circuit and the voltage of the series resonance capacitor, or the inverter current, the voltage difference between bridge arms of the inverter circuit and the voltage of a series resonance capacitor, and the like.

In some embodiments, when at least one stage of inner loop control circuit of at least two stages of inner loop control circuits is coupled to the first internal circuit module and the second internal circuit module of the high-voltage generator, the control device 300 may determine a target physical parameter based on the first internal physical parameter corresponding to the first internal circuit module and the second internal physical parameter corresponding to the second internal circuit module. The control device 300 may determine the inner loop control parameter corresponding to the target physical parameter based on the target physical parameter and the outer loop control parameter.

For example, in response to determining that a kth stage of inner loop control circuit is coupled to two internal circuit modules, as shown in FIG. 5A, the kth stage of inner loop control circuit may process the first internal physical parameter corresponding to the first internal circuit module and the second internal physical parameter corresponding to the second internal circuit module through two signal processing modules, respectively. Then the kth stage of inner loop control circuit may obtain the kth stage of inner loop control circuit corresponding to the target physical parameter through analog domain mathematical processing and analog-to-digital conversion. Further, as shown in FIG. 5B, a kth stage of inner loop control circuit may process the first internal physical parameter through a signal processing module and an analog-to-digital conversion module, process the second internal physical parameter through another signal processing module and another analog-to-digital conversion module, respectively, and then process the processed first internal physical parameter and the processed second internal physical parameter through digital-domain mathematical processing to obtain the kth stage of inner loop control circuit corresponding to the target physical parameter. An output value of the stage of inner loop control circuit (i.e., an inner loop control parameter output by the kth stage of inner loop control circuit) is further obtained by inner loop k operations based on the target physical parameter and a corresponding value of the target physical parameter. In some embodiments, the value corresponding to the target physical parameter may be determined based on integral values of initial values of two or more internal physical parameters.

It should be understood that the above embodiment is merely provided as an example, and when at least one stage of inner loop control circuit is coupled to a plurality of internal circuit modules, the target physical parameter may first be determined based on the plurality of internal physical parameters corresponding to the plurality of internal circuit modules, and the inner loop control parameter corresponding to the target physical parameter may be further determined based on the target physical parameter and the outer loop control parameter (or an inner loop control parameter output by a previous stage of inner loop control circuit). Furthermore, FIGS. 5A and 5B and the related descriptions thereof are provided by way of example, and in some embodiments, a sampled value of the target physical parameter corresponding to the inner loop control circuit may be determined based on two or more internal physical parameters by other manners, which is not limited by the present disclosure.

In some embodiments, when two or more internal physical parameters are sampled simultaneously by the inner loop control circuit at one level, a target physical parameter may be determined based on the sampled two or more internal physical parameters. The inner loop control parameter corresponding to the target physical parameter may be determined based on the target physical parameter and the outer loop control parameter (or the inner loop control parameter output by a previous stage of inner loop control circuit). For example, an inner loop control circuit that simultaneously samples two or more internal physical parameters may be achieved by a manner shown in FIG. 5A. For example, the inner loop control circuit may determine a target physical parameter by processing the sampled two or more internal physical parameters through signal processing, analog-domain mathematical processing, and analog-to-digital conversion. Alternatively, the inner loop control circuit that simultaneously samples two or more internal physical parameters may be achieved by a manner shown in FIG. 5B. For example, the inner loop control circuit may determine the target physical parameter by processing the sampled two or more internal physical parameters through signal processing, digital-domain conversion, and digital-domain mathematical processing.

FIG. 6 is a structure diagram illustrating an exemplary high-voltage generator and a control device thereof according to some embodiments of the present disclosure.

In some embodiments, as shown in FIG. 6, each stage of inner loop control circuit may include a signal processing module, an analog-to-digital conversion module, and an inner loop computation module. The signal processing module may process a sampled value (e.g., a current output voltage, an internal physical parameter, etc.) with, for example, proportional scaling, analog or digital filtering, and overrun or lag compensation. The analog-to-digital conversion module may convert the processed sampled value (e.g., a processed output voltage, the internal physical parameter, etc.) into a digital signal. The inner loop/outer loop computation module may perform a computation (e.g., a subtraction operation) on the digital signal corresponding to the sampled value and a setting parameter (e.g., a target output voltage, an output value of the outer loop control circuit or an upper inner loop control circuit, etc.) to obtain the output value of the outer loop control circuit (hereinafter referred to as an outer loop output value or an outer loop control parameter)/an output value of an inner loop control circuit (also referred to as an inner loop control parameter). In some embodiments, the outer loop output value may be used as a setting value for a first-stage inner loop control circuit (e.g., the first-stage inner loop control circuit 320-1) of the multiple stages of inner loop control circuits.

In some embodiments, the inner loop control circuit may include two inputs, an input of the inner loop control circuit may be connected to an internal circuit module of the high voltage generator and may be configured to sample one or more internal physical parameters corresponding to the internal circuit module; and the input of the inner loop control circuit may receive an output value of a previous stage of control circuit (e.g., an outer loop control parameter, an inner loop control parameter corresponding to a previous stage of inner loop control circuit). In some embodiments, the inner loop control circuit may determine an inner loop control parameter corresponding to a current internal circuit module based on the sampled internal physical parameters and the outer loop control parameter (or inner loop control parameter corresponding to the previous stage of inner loop control circuit). The inner loop control parameter may be configured to control an actual internal physical parameter value corresponding to a corresponding internal circuit module.

For example, as shown in FIG. 6, a first input of the first-stage inner loop control circuit 320-1 may be configured to sample an internal physical parameter $P_1$, and a sampled value of the internal physical parameter $P_1$ may enter an inner loop 1 computation after a signal processing and an analog-to-digital conversion; and a second input of the first-stage inner loop control circuit 320-1 may receive the output value (e.g., the outer loop control parameter) of the outer loop control circuit 310. An output value (e.g., the first inner loop control parameter) of the first-stage inner loop control circuit 320-1 may be obtained by performing the inner loop 1 computation on a sampled value of the processed internal physical parameter $P_1$ and an output value of the outer loop control circuit 310. Further, a first input of the second-stage inner loop control circuit 320-2 may sample an internal physical parameter $P_2$, and a sampled value of the internal physical parameter $P_2$ may enter an inner loop 2 operation after the signal processing and the analog-to-digital conversion; and a second input of the second-stage inner loop control circuit 320-2 may receive the output value of the first-stage inner loop control circuit 320-1 (the first inner loop control parameter).

In some embodiments, an output value of the last stage of inner loop control circuits in the multiple stages of inner loop control circuits (e.g., the $M^{th}$ stage of inner loop control circuits **320-*m*) may be input into a switching tube driver generation module 330** to generate a closed loop control parameter for controlling the output of the high-voltage generator.

In some embodiments, the control device 300 may further include a limiting module of the inner loop control parameters (not shown in the figures), and the limiting module of the inner loop control parameters may limit one or more values of one or more inner loop control parameters corresponding to the multiple stages of inner loop control circuits.

In some embodiments, a value range of a corresponding inner loop control parameter may be dynamically determined based on the internal physical parameter and/or the target output state. In some embodiments, each of the one or more value ranges of the one or more inner loop control parameters includes an upper limit value of the inner loop control parameter and/or a lower limit value of the inner loop control parameter.

In some embodiments, a limiting module of the inner loop control parameters may determine the one or more value ranges of the one or more inner loop control parameters based on a preset relationship between the one or more value ranges and the one or more inner loop control parameters and/or a preset relationship between the one or more value ranges and the target output state. In some embodiments, the preset relationship between the one or more value ranges and the one or more inner loop control parameters and/or a preset relationship between the one or more value ranges and the target output state may be recorded in a preset table. Based on this, the limiting module of the inner loop control parameters may determine a value range of the at least one of the plurality of inner loop control parameters corresponding to the multiple stages (e.g., M stages) of inner loop control circuits by determining or looking up a preset table based on the target output state. For example, a limiting module corresponding to each stage of control circuitry may obtain an upper limit value and/or a lower limit value of a corresponding amplitude based on the target output state using preset program instructions. In some embodiments, an upper limit value and/or a lower limit value of at least one of the plurality of inner loop control parameters may be determined by determining (e.g., by substituting a preset functional equation) or looking up the preset table based on the target output state and a real-time sampled value of one or more internal physical parameters. For example, the upper limit value and/or the lower limit value of the amplitude of the one or more inner loop control parameters of the inner loop control circuit corresponding to the inverter current may be determined by determining or looking up the preset table based on the real-time sampled value of the inverter current and the target output state. The preset table may include upper limit values and/or lower limit values corresponding to each of the one or more inner loop control parameters. In some embodiments, the preset table may be constructed based on the target output state and real-time output values of the plurality of internal physical parameters.

In some embodiments, the upper limit value or the lower limit value of the inner loop control parameter may be determined based on a time-varying value trajectory. A trajectory line of the lower limit value may be configured to improve a dynamic performance to enable fast switching from a transient state (e.g., the current output state) to the target output state (e.g., a target steady state). For example, the trajectory line of the lower limit value may enable a fast return to an output voltage after CT bulb firing. A trajectory line of the upper limit value may be configured to protect the voltage and current (e.g., inverter currents in the high-voltage generator, series resonance capacitor voltages, etc.) at key points inside the high-voltage generator to protect against the stress. The trajectory line of the upper limit value may be configured to protect the voltage and current (e.g., an inverter current in the high-voltage generator, a series resonance capacitor voltage in the high-voltage generator, etc.) and other stresses at key points inside the generator.

Merely by way of example, based on the control device as shown in FIG. 6, the outer loop control circuit 310 may obtain the outer loop control parameter based on a target output voltage and the current output voltage obtained by sampling through the outer loop computation. The outer loop control circuit 310 may determine the upper limit value and/or the lower limit value of the amplitude corresponding to the first-stage inner loop control circuit 320-1 based on the target output state or the internal physical parameter $P_1$ by determining or looking up the preset table or based on the range determination model, thereby determining an inner loop setting value $S_1$ of the first-stage inner loop control circuit 320-1 based on the upper limit value and/or the lower limit value and the outer loop control parameter. The first-stage inner loop control circuit 320-1 may obtain an output value (e.g., the inner loop control parameter corresponding to the internal physical parameter $P_1$) of the first-stage inner loop control circuit based on an inner loop setting value $S_1$ and a sampled value of the internal physical parameter $P_1$ through the inner loop 1 computation.

In some embodiments, the limiting module of the inner loop control parameters may determine the one or more value ranges using the range determination model based on the one or more internal physical parameters and/or the target output state.

The range determination model may be a machine learning model. An Input of the range determination model may include the one or more internal physical parameters and/or the target output state, and an output of the range determination model may include the one or more value ranges corresponding to the one or more inner loop control parameters.

In some embodiments, the range determination model may be obtained by training a plurality of second training samples labeled with a second label. For example, the plurality of second training samples labeled with the second label may be input into the initial range determination model, a value of a loss function may be determined by the second label and a result of an initial range determination model, and the parameters of the initial range determination model may be iteratively updated based on the value of the loss function. When the loss function of the initial range determination model satisfies a preset condition for terminating the training, the training of the initial range determination model may be completed, and the trained range determination model may be obtained. The second training sample may include a sample internal physical parameter and/or a sample target output state, which may be obtained based on a historical operation process of the control device of the high-voltage generator. The second label may refer to a value range of the inner loop control parameter corresponding to the second training sample, which may be determined based on manual labeling. The preset condition for the end of training may be that the loss function converges (e.g., a mean square error of the loss function may be less than the second error threshold), the count of iterations is equal to or less than a second number threshold, etc.

In some embodiments of the present disclosure, the value range of the inner loop control parameter determined by the method described above may effectively improve an adaptability of the determined value range, so that a limitation to the value of the inner loop control parameter realized based on the value range may be conducive to a rapid switching of the current output state to the target output state and/or avoid the value of the inner loop control parameter from exceeding a critical value (e.g., a maximum value), thereby well protecting current and voltage stresses of devices inside the high-voltage generator.

In some embodiments of the present disclosure, the limitation to the value may enable a fast switching of the current output state to the target output state and/or avoid the value from exceeding the critical value (e.g., the maximum value), thereby protecting the current voltage stress of the internal devices of the high-voltage generator.

It should be noted that the above description of the control device 300 is merely provided for the purpose of illustration and is not intended to limit the scope of the present disclosure. For those skilled in the art, a wide variety of amendments and variations may be made based on the description of the present disclosure. However, these amendments and variations do not depart from the scope of the present disclosure.

Figure 7:
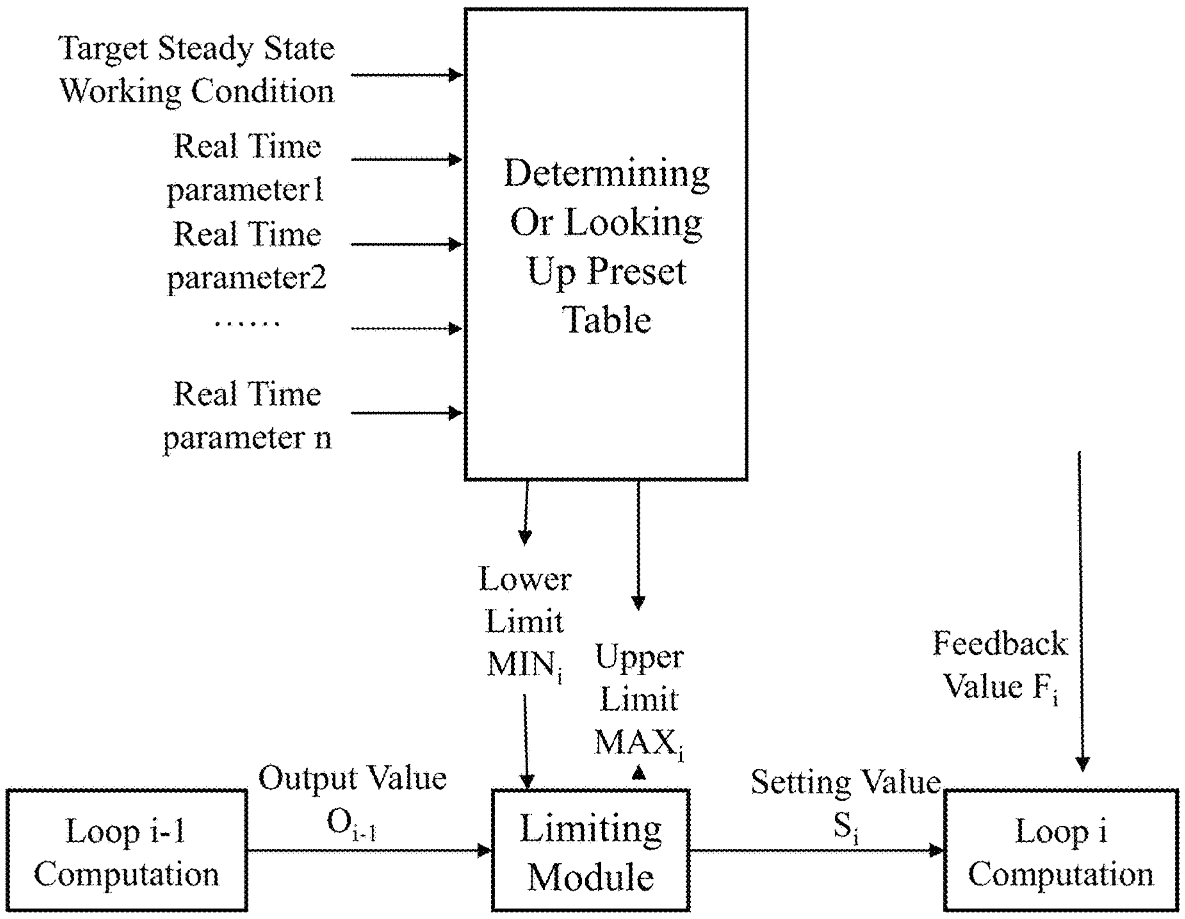
FIG. 7 is a structure diagram illustrating an exemplary limiting module of an inner loop control parameter according to some embodiments of the present disclosure.

FIG. 7 is a structure diagram illustrating an exemplary limiting module for inner loop control parameters according to some embodiments of the present disclosure.

In some embodiments, each stage of control circuit (e.g., the outer loop control circuit 310, the first-stage inner loop control circuit 320-1, the second-stage inner loop control circuit 320-2, . . . , the $M^{th}$-stage inner loop control circuit **320-*m***) may be processed by processing an output value of the control circuit of that stage, to obtain a setting value of the next stage of control circuit. For example, when the output value is within a value range of the inner loop control parameter of the stage of control circuit, the output value may be determined as the setting value; when the output value is greater than the upper limit value of the inner loop control parameter of the stage of control circuit, the upper limit value of the value range may be determined as the setting value; and when the output value is less than the lower limit value of the inner loop control parameter of the stage of control circuit, the lower limit of value the value range may be determined as the setting value.

In some embodiments, a value range (e.g., the upper limit or the lower limit) of the inner loop control parameter corresponding to the inner loop control circuit may be determined based on real-time internal physical parameter (e.g., an actual value of the internal physical parameter in the circuit at the current moment) and/or a target output state of the internal circuit module to which the inner loop control circuit is coupled. More description of the value range of the inner loop control parameter may be found in FIG. 6 and the related description thereof.

In some embodiments, the inner loop control parameter of the internal physical parameter of the internal circuit module coupled to the inner loop control circuit may be determined in real time based on the inner loop setting value corresponding to the inner loop control circuit and the real-time sampled value of the internal physical parameter.

For example, as shown in FIG. 7, a $i-1^{th}$-stage control circuit (e.g., an outer loop control circuit, or any one of stages 1~M−1-stage inner loop control circuits) may obtain an output value $O_{i-1}$ of the $i-1^{th}$-stage control circuit by a loop i−1 computation (e.g., an inner loop computation or an outer loop computation), based on the target output state or the internal physical parameter (e.g., a real time physical parameter) corresponding to the $i^{th}$-stage control circuit, an upper limit MAX; and/or a lower limit MIN; of an amplitude of the $i^{th}$-stage control circuit (e.g., any one of the 1~M inner loop control circuits) may be obtained by determining or looking up the preset table, and the limiting module may determine a setting value $S_i$ of the $i^{th}$-stage control circuit based on the output value $O_{i-1}$, the upper limit MAX; and/or the lower limit $MIN_i$. Further, the $i^{th}$-stage control circuit may obtain an output value $O_i$ of the $i^{th}$-stage control circuit based on a feedback value Fi and the setting value $S_i$ (e.g., a sampled value corresponding to an internal physical parameter Pi), wherein i may be greater than 1.

Figure 8:
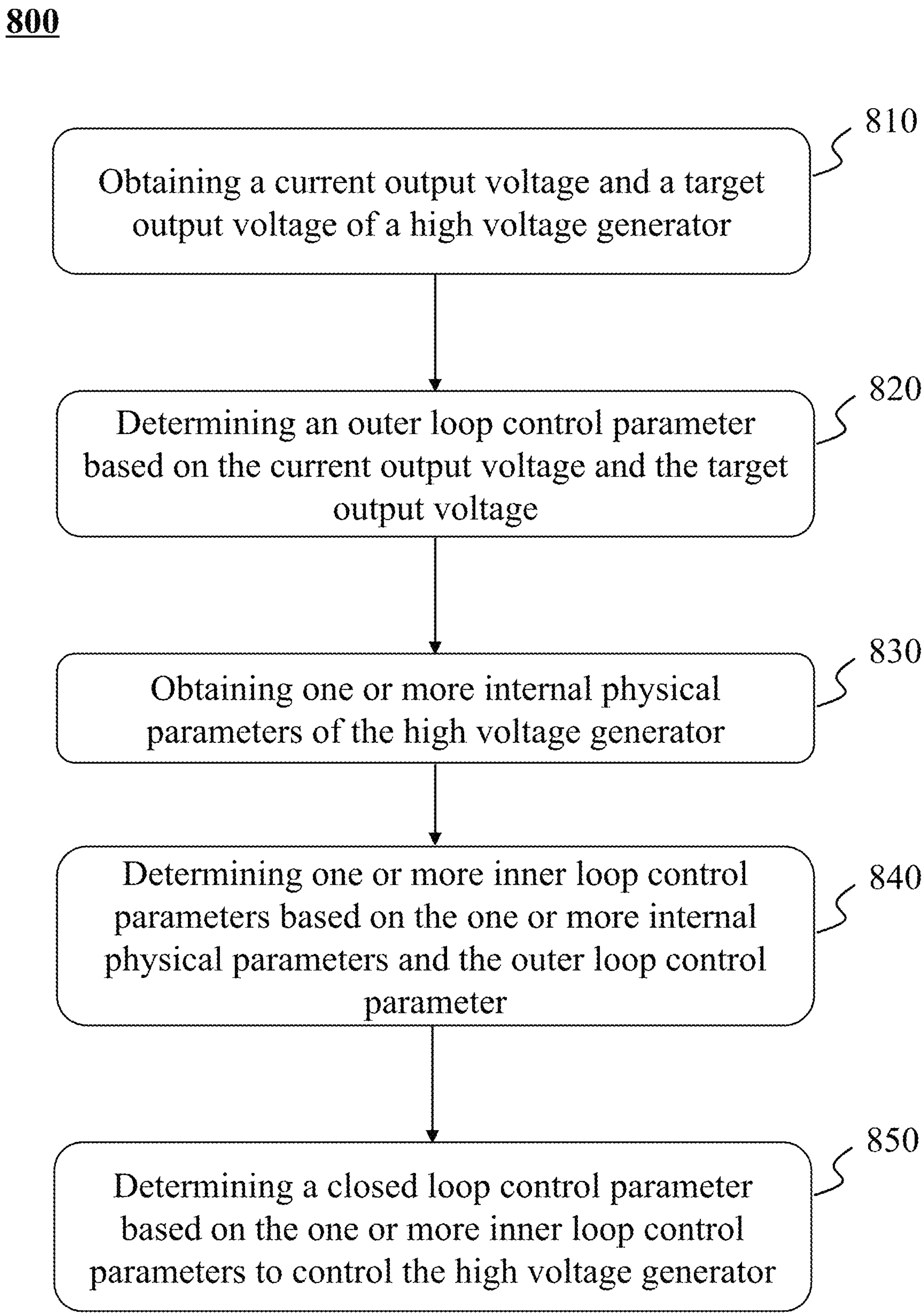
FIG. 8 is a flowchart illustrating an exemplary method for controlling a high-voltage generator according to some embodiments of the present disclosure.

FIG. 8 is a flowchart illustrating an exemplary process for controlling a high-voltage generator according to some embodiments of the present disclosure.

In some embodiments, process 800 may be executed by the control device 300. The schematic diagram illustrating an operation of the process 800 presented below is illustrative. In some embodiments, one or more additional operations not described and/or one or more operations not discussed may be used to complete the process. Further, the sequence of operations of the process 800 illustrated in FIG. 8 and described below is not intended to be limiting.

In 810, a current output voltage and a target output voltage of the high-voltage generator may be obtained.

The current output voltage may refer to a real-time output voltage of the high-voltage generator corresponding to the current output state.

Correspondingly, the target output voltage may refer to an output voltage of the high-voltage generator corresponding to the target output state. Both the current output voltage and the target output voltage may be voltages provided to the bulb tube by the high-voltage generator.

In some embodiments, the current output state may include a state that meets a preset condition (e.g., a working requirement of a CT device), or a state that does not meet the preset condition. In some embodiments, the target output state may include a state that meets the preset condition. For example, the current output state may be a state that meets the work requirements and the target output state is the next state that meets the working requirement. As another example, the current output state may be a state that does not meet the working requirement, and the target output state may be a target steady state that meets the working requirement.

In some embodiments, the control device 300 may sample the current output voltage of the high-voltage generator. In some embodiments, an input end of the outer loop control circuit of the control device 300 may be connected to an output end of the high-voltage generator to sample the current output voltage. For example, as shown in FIG. 6, one of two inputs of the outer loop control circuit 310 may be connected to an output end of a rectifier filter of the high-voltage generator to sample the current output voltage.

In some embodiments, the control device 300 may determine the target output voltage based on the target output state. For example, a corresponding target output voltage may be determined based on the target output state in a scanning protocol of a target object.

In some embodiments, after obtaining the target output voltage, the high-voltage generator may make a judgment on the current state to determine whether an output condition is satisfied. In response to determining that the output condition is not met, the high-voltage generator provides feedback for the X-ray imaging device. The X-ray imaging device may readjust the target output voltage and/or the output time, etc., based on the feedback, and send an adjusted target output voltage to the high-voltage generator. The output condition may include an own temperature condition and/or a voltage reasonable condition of the high-voltage generator, and the like. The own temperature condition may be that the own temperature of the high-voltage generator is less than a temperature threshold, and the voltage reasonable condition may mean that the target output voltage is within a theoretically outputtable voltage range of the high-voltage generator.

In 820, an outer loop control parameter may be determined based on the current output voltage and the target output voltage.

The outer loop control parameter may refer to an output value of the outer loop control circuit. In some embodiments, the outer loop control circuit 310 may process a sampled current output voltage with proportional scaling, analog or digital filtering, overrun or lag compensation, analog-to-digital conversion, and the like. In some embodiments, the outer loop control circuit 310 may determine an outer loop control parameter based on the processed signal and the target output voltage through an outer loop computation. In some embodiments, the outer loop control parameter may be a digital parameter.

In 830, one or more internal physical parameters of the high-voltage generator may be obtained.

In some embodiments, the control device 300 may determine the sampling physical parameter based on a preset condition using a trained physical parameter determination model. The sampling physical parameter may refer to an internal physical parameter to be sampled.

In some embodiments, the preset condition may include preset performance parameters.

The preset performance parameters refer to data reflecting the performance requirements of devices used for sampling internal physical parameters, including sensors, signal processing modules, analog-to-digital converters, etc. The performance requirements may include overall performance requirements and individual performance requirements, where overall performance requirements reflect the overall performance requirements of all devices used for sampling internal physical parameters, and the individual performance requirements reflect the individual performance requirements of each device used for sampling internal physical parameters. The overall performance requirements and the individual performance requirements may be characterized based on overall performance levels and individual performance levels, respectively. For example, the individual performance levels may be preset with a lower limit of level 0 and an upper limit of level 3, level 5, level 7, or level 10, etc. The overall performance levels are the sum of the individual performance levels of all devices, where the higher the individual performance level is, the higher the performance requirements for the devices used when sampling the internal physical parameters, and correspondingly, the higher the accuracy of the sampling results is. An individual performance level of level 0 represents that there is no need to collect corresponding internal physical parameters, i.e., there is no need to set corresponding devices to collect the internal physical parameters. For example, the preset performance parameters may be "The overall performance level is between levels 30 and 40, the performance level of the device used to collect the inverter current of the inverter circuit does not exceed level 5, and the performance level of the device used to collect the voltage of the series resonant capacitor of the resonant network is between levels 3 and 8 . . . ".

In some embodiments, the preset performance parameters may include at least a steady-state performance parameter and a dynamic performance parameter.

The steady-state performance parameter may refer to data reflecting the stability of a device such as a sensor, a signal processing module, an analog-to-digital converter, and the like. For example, the steady-state performance parameter may be characterized based on an error between the sampled value of the internal physical parameter collected by the sensor and the real value. For example, the steady-state performance parameter may be that "an error between the sampled value of the internal physical parameter collected by the sensor and the real value is not greater than 2%".

The dynamic performance parameter may refer to data reflecting a response speed of the sensor, the signal processing module, the analog-to-digital converter, and other devices. For example, the dynamic performance parameter may be characterized based on a sampling time stage corresponding to the time required for sampling the sampling physical parameter by the sensor. For example, the time required for sampling may be preset to be stage 1 in a range of [0, 20 ms], stage 2 in a range of (20, 40 ms], stage 3 in a range of (40, 60 ms], and so on. For example, the dynamic performance parameter may be that "the sampling time stage is 2 stage".

In some embodiments, the control device 300 may determine physical parameters by inputting the preset cost parameters into the physical parameter determination model. The control device 300 may determine the sampling physical parameter based on the physical parameters. For example, the preset performance parameters are input into the physical parameter determination model, and the physical parameter determination model outputs the corresponding physical parameters.

In some embodiments, the physical parameters may include at least one of a type of internal physical parameter, a sequence of determination of internal physical parameters, or a sampling scheme corresponding to each of the internal physical parameters.

The type of internal physical parameter (which may also be referred to as the type of sampling physical parameter) may refer to the internal physical parameter to be collected. For example, the type of internal physical parameter may include an inverter current, a voltage of a series resonance capacitor, a voltage difference between bridge arms of the inverter circuit, and so on.

The sequence of determination of internal physical parameters may refer to a sequence in which the collected internal physical parameters are used in determinations of the inner loop control parameters. For example, taking the type of internal physical parameters including physical parameter 1, physical parameter 2, and physical parameter 3 as an example, a possible sequence of determination of internal physical parameters may be physical parameter 2, physical parameter 1, and physical parameter 3. A practical significance of the sequence may include: determining an inner loop control parameter 2 corresponding to the physical parameter 2 based on the physical parameter 2 and an outer loop control parameter, determining an inner loop control parameter 1 corresponding to the physical parameter 1 based on the physical parameter 1 and an inner loop control parameter 2, and determining an inner loop control parameter 3 corresponding to a physical parameter 3 based on the physical parameter 3 and an inner loop control parameter 1.

The sampling scheme corresponding to each of the internal physical parameters may refer to the data reflecting the sampling of the internal physical parameters. For example, a sampling scheme corresponding to the internal physical parameter may include "a collection error of the sensor is not greater than 2%, and the sampling time is less than 90 ms", etc.

In some embodiments, the determining the sampling physical parameter based on the physical parameters may include: the physical parameters corresponding to the types of internal physical parameters included in the physical parameters are sampled according to a sequence of determination of internal physical parameters and a sampling scheme corresponding to each of the internal physical parameters.

The physical parameter determination model may be a machine learning model. More descriptions of the physical parameter determination model may be found in FIGS. 9A and 9B and the related descriptions thereof.

In conjunction with the above, the high-voltage generator may include a plurality of internal circuit modules, and accordingly, each module may correspond to one or more internal physical parameters. In some embodiments, each of the multiple stages of inner loop control circuits may be coupled and connected to each of the plurality of internal circuit modules, respectively. The each of the plurality of inner loop control circuits may be configured to sample internal physical parameters corresponding to the plurality of internal circuit modules that is connected to the each of the plurality of inner loop control circuits. In some embodiments, at least one stage of the multiple stages of inner loop control circuits may be coupled and connected to two or more internal circuit modules of the plurality of internal circuit modules, and configured to sample one or more internal physical parameters corresponding to the two or more internal circuit modules. In some embodiments, each stage of inner loop control circuit of the multiple stages of inner loop control circuits may be configured to sample one internal physical parameter, respectively.

In some embodiments, one of two inputs of the inner loop control circuit of the control device 300 may be connected to an internal circuit module and configured to sample internal physical parameters corresponding to the internal circuit modules. For example, as shown in FIG. 6, one input end of the first-stage inner loop control circuit 320-1 may be connected to the internal physical parameter $P_1$ and configured to sample the internal physical parameter $P_1$; one input end of the second-stage inner loop control circuit 320-2 may be connected to the internal physical parameter $P_2$ and configured to sample the internal physical parameter $P_2$; and one input end of the $M^{th}$-stage inner loop control circuit 320-*m* may be connected to the internal physical parameter $P_n$ and configured to sample the internal physical parameter $P_n$.

In 840, one or more inner loop control parameters of the high voltage generator may be determined based on the one or more internal physical parameters and the outer loop control parameter.

As above, the inner loop control parameter may refer to an output value of the inner loop control circuit. In some embodiments, for each stage of the multiple stages of inner loop control circuit, the control device 300 may determine a corresponding inner loop control parameter.

In some embodiments, when the multiple stages of inner loop control circuits include a first-stage inner loop control circuit coupled to a first internal circuit module and a second-stage inner loop control circuit coupled to a second internal circuit module, the control device 300 (e.g., the inner loop control circuit 320) may determine a first inner loop control parameter based on the outer loop control parameter and the first-stage internal physical parameter corresponding to the first internal circuit module. Further, the control device 300 may determine a second inner loop control parameter based on a second internal physical parameter corresponding to the second internal circuit module and the first inner loop control parameter. When a plurality of inner loop control circuits is included, identically, each stage of inner loop control circuits performs an inner loop computation based on the sampled internal physical parameters and an output value of the previous stage of inner loop control circuit, respectively, to obtain a corresponding inner loop control parameter.

For example, when each stage of inner loop control circuit samples an internal physical parameter, the first-stage inner loop control circuit may obtain an output value of the first-stage inner loop control circuit. For example, the first-stage inner loop control circuit may obtain a first inner loop control parameter by performing an inner loop 1 computation on the sampled value of the processed internal physical parameter $P_1$ and the outer loop control parameter output by the outer loop control circuit 310; and the second-stage inner loop control circuit may obtain an output value of the second-stage inner loop control circuit. For example, the second-stage inner loop control circuit may obtain a second inner loop control parameter by performing an inner loop 2 operation on the sampled value of the processed internal physical parameter $P_2$ and the output value of the first-stage inner loop control circuit.

For example, when the first-stage inner loop control circuit samples a plurality of internal physical parameters and the second-stage inner loop control circuit samples a single internal physical parameter, the first-stage inner loop control circuit may first determine a target physical parameter based on the sampled plurality of internal physical parameters (e.g., in the manner illustrated in FIG. 5A or 5B), and then perform the inner loop 1 computation on the processed target physical parameters and the outer loop control parameters output by the outer loop control circuit 310 to obtain an output value of the first-stage inner loop control circuit. The second-stage inner loop control circuit may perform the inner loop 2 operation on the sampled values of the processed internal physical parameters $P_2$ and the output value of the first-stage inner loop control circuit to obtain an output value of the second-stage inner loop control circuit.

In some embodiments, when at least one stage of inner loop control circuit of multiple stages of inner loop control circuits is coupled to a first internal circuit module and a second internal circuit module of the high-voltage generator, the control device 300 may determine a target physical parameter based on a first internal physical parameter corresponding to the first internal circuit module and a second internal physical parameter corresponding to the second internal circuit module. The control device 300 may determine an inner loop control parameter corresponding to the target physical parameter based on the target physical parameter and the outer loop control parameter.

In some embodiments, the one or more value ranges of the one or more inner loop control parameters may be dynamically determined based on the corresponding one or more internal physical parameters and/or the target output state. For example, each of the one or more inner loop control parameters corresponds to a value range of the one or more value ranges.

In conjunction with the above, each of the one or more value ranges of the one or more inner loop control parameters may include an upper limit value and/or a lower limit value of the inner loop control parameter, the upper limit value or the lower value may be determined based on a value trajectory over time. In some embodiments, the one or more value ranges of the one or more inner loop control parameters may be determined based on the a preset relationship between the one or more value ranges and the one or more inner loop control parameters and/or a preset relationship between the one or more value ranges and the target output state.

In some embodiments, the control device 300 may obtain the target output state, and determine the upper limit value and/or the lower limit value of the amplitude of the at least one inner loop control parameter based on the target output state and/or the corresponding internal physical parameter by determination. For example, a target output voltage and a target internal physical parameter may be determined by substituting the target output voltage and the target internal physical parameter into a preset mathematical equation to obtain an amplitude upper limit and/or an amplitude lower limit corresponding to the current inner loop control parameter.

In some embodiments, the control device 300 may determine an upper limit and/or a lower limit of a plurality of inner loop control circuits corresponding to at least one of the multiple stages of inner loop control circuits by determining or looking up the preset table based on the target output state. In some embodiments, the control device 300 may determine the value range using a range determination model based on the internal physical parameter and/or the target output state. More description of the above embodiments may be found in FIG. 6 and the related description thereof.

Merely by way of example, after obtaining an output value (e.g., the outer loop control parameter) of an outer loop control circuit, based on the first internal physical parameter or the target output state corresponding to the first-stage inner loop control circuit, the upper limit value and the lower limit value corresponding to the corresponding inner loop control parameter may be determined by determining or looking up the preset table. A first inner loop setting value of the first-stage inner loop control circuit may be obtained based on the upper limit value and the lower limit value and the outer loop control parameter. The first-stage inner loop control circuit generates a signal based on the first inner loop setting value of the first-stage inner loop control circuit and a feedback value (e.g., a sampled value of one or more internal physical parameters corresponding to the first-stage inner loop control circuits), which may cause an output voltage to reach a first threshold value (e.g., 20%). A second inner loop setting value of the second-stage inner loop control circuit second is obtained based on the output value of the first-stage inner loop control circuit and the upper limit value and the lower limit value of the inner loop control parameter corresponding to the second-stage inner loop control circuit, and the second-stage inner loop control circuit generates a signal based on a second inner loop setting value of the second-stage inner loop control circuit and the feedback value (e.g., a sampled value of one or more internal physical parameters corresponding to the second-stage inner loop control circuit), which may cause an output voltage to reach a second threshold value (e.g., 30%). By limiting the value range of the at least one inner loop control parameter based on a real-time output value of the at least one related internal physical parameter of the high-voltage generator, the output voltage may be made to reach a reference value (e.g., a target output voltage value) gradually.

As a further example, a lower limit trajectory line of the internal physical parameter $P_1$ may be adjusted so that the output voltage of the high-voltage generator reaches the target output voltage quickly. As another example, an upper limit trajectory line of the internal physical parameter $P_1$ may be adjusted so that the current output voltage does not exceed a corresponding threshold value in the process of reaching the target output voltage. As another example, the upper limit trajectory line and the lower limit trajectory line of two or more internal physical parameters among a plurality of internal physical parameters, such as the inverter current of the high-voltage generator, the voltage of the series resonance capacitor, the voltage difference between bridge arms of the inverter circuit, the primary voltage of the transformer, the output current, etc., may be adjusted such that a boosting time corresponding to a light load and a heavy load is kept the same or basically the same.

In some embodiments, the one or more value ranges of the one or more inner loop control parameters corresponding to the current inner loop control circuit may be determined based on the one or more internal physical parameters and/or the target output state corresponding to the current inner loop control circuit. One or more inner loop setting values of the inner loop control circuit may be determined based on the one or more value ranges of the one or more inner loop control parameters and the outer loop control parameter (or the inner loop control parameter output by the previous stage of the inner loop control circuit). The one or more inner loop control parameters of the inner loop control circuit may be determined based on the one or more inner loop setting values and the one or more internal physical parameters. In some embodiments, the target output state may include an output voltage instruction value (e.g., a target output voltage) and an output current instruction value of the high-voltage generator. More description of the above embodiments may be found in FIG. 10 and the related description thereof.

In some embodiments, when the control device 300 includes two stages of inner loop control circuits respectively coupled to the two internal circuit modules, the control device 300 may determine a first inner loop control parameter based on a first internal physical parameter corresponding to the first internal circuit module and an outer loop control parameter. The control device 300 may determine a second inner loop control parameter based on a second internal physical parameter corresponding to the second internal circuit module and the first inner loop control parameter. More description of the above embodiments may be found in FIG. 11 and the related description thereof.

In 850, a closed loop control parameter of the high voltage generator may be determined based on the one or more inner loop control parameters to control the high voltage generator.

In some embodiments, the inner loop control parameter output by the last stage of inner loop control circuit (e.g., a $M^{th}$-stage of inner loop control circuit) of the multiple stages of inner loop control circuits may be determined as a closed loop control parameter of the high-voltage generator to control the high-voltage generator.

In conjunction with the above embodiment, when the control device 300 may include a two-stage inner loop control circuit coupled to each of the two internal circuit modules, the closed loop control parameter may be determined based on the second inner loop control parameter output from the second-stage inner loop control circuit, and the switching tube driver generation module 330 may generate a control signal (e.g., the closed loop control parameter) based on the second inner loop control parameter. The control signal may be configured to control an output of the high-voltage generator by controlling connectivity or blocking of a switching tube in the high-voltage generator, thereby causing the high-voltage generator to quickly reach a target steady state. For example, the second inner loop control parameter may be determined as a closed loop control parameter. More description of the second inner loop control parameter may be found in FIG. 11 and the related description thereof.

It should be noted that the above description of process 800 is merely provided for the purposes of illustration and is not intended to limit the scope of the present disclosure. For those skilled in the art, a wide variety of amendments and variations may be made based on the description of the present disclosure. However, these amendments and variations do not depart from the scope of the present disclosure.

Figure 9A:
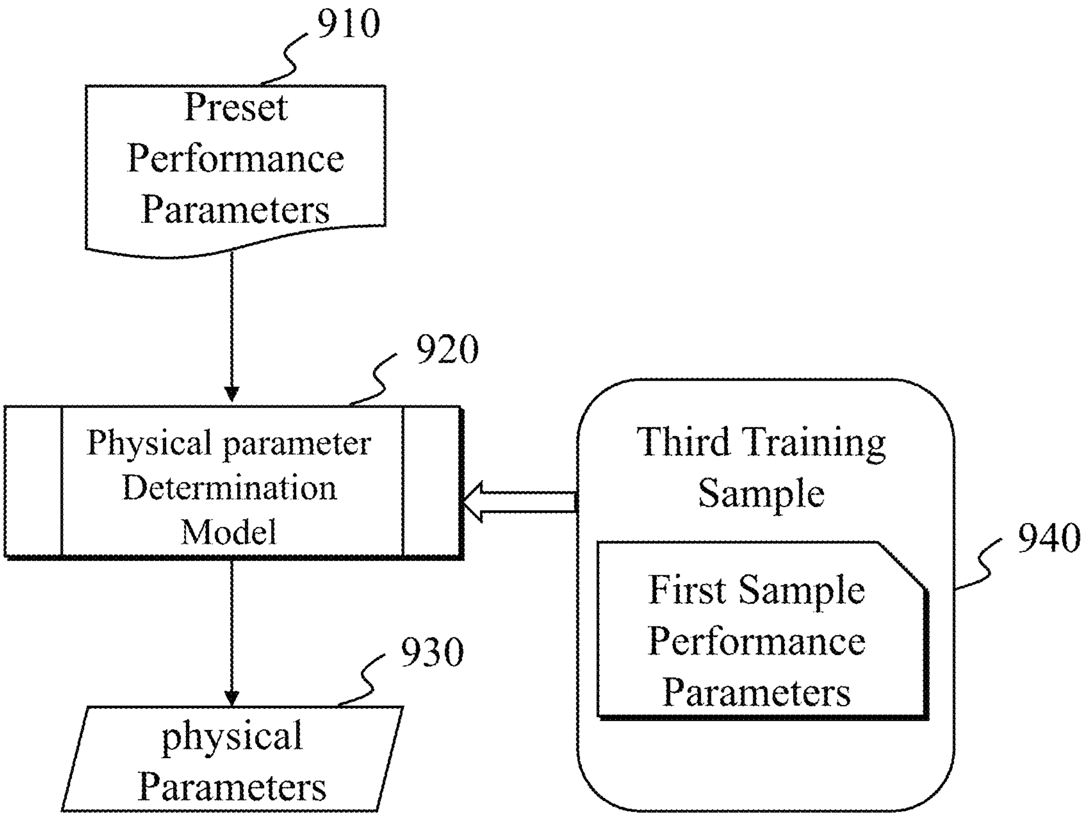
FIG. 9A is a schematic diagram illustrating a physical parameter determination model according to some embodiments of the present disclosure.

FIG. 9A is a schematic diagram illustrating a physical parameter determination model according to some embodiments of the present disclosure.

In some embodiments, as shown in FIG. 9A, inputs of the physical parameter determination model 920 may include preset performance parameters 910, and outputs of the physical parameter determination model 920 may include physical parameters 930. For example, after inputting the preset performance parameters 910 into the physical parameter determination model 920, the physical parameter determination model 920 may output the physical parameters 930 after an analytical process. At least one sampling physical parameter may be determined based on the physical parameters 930. The control device 300 may sample the at least one sampling physical parameter through at least one stage of inner loop control circuit.

In some embodiments, as shown in FIG. 9A, the physical parameter determination model 920 may be trained by a plurality of third training samples 940 labeled with a third label. For example, a plurality of third training samples 940 labeled with the third label may be input into an initial physical parameter determination model, a value of the loss function may be determined through the third label and a result of the initial physical parameter determination model, and the parameters of the initial physical parameter determination model may be iteratively updated based on the value of the loss function. The model training is completed when the loss function of the initial physical parameter determination model satisfies the preset condition for terminating the training, and the trained physical parameter determination model 920 may be obtained. The plurality of third training sample 940 may include first sample performance parameters. The first sample performance parameters may be determined based on performance parameters of a historical operation process of the control device. The third label may refer to the physical parameters corresponding to the third training sample 940. The third label may be determined based on manual labeling or systematic automatic labeling. The preset condition for the end of training may be that the loss function converges (e.g., the mean square error of the loss function is less than the third error threshold), the count of iterations reaches the third count of times threshold, and the like.

Figure 9B:
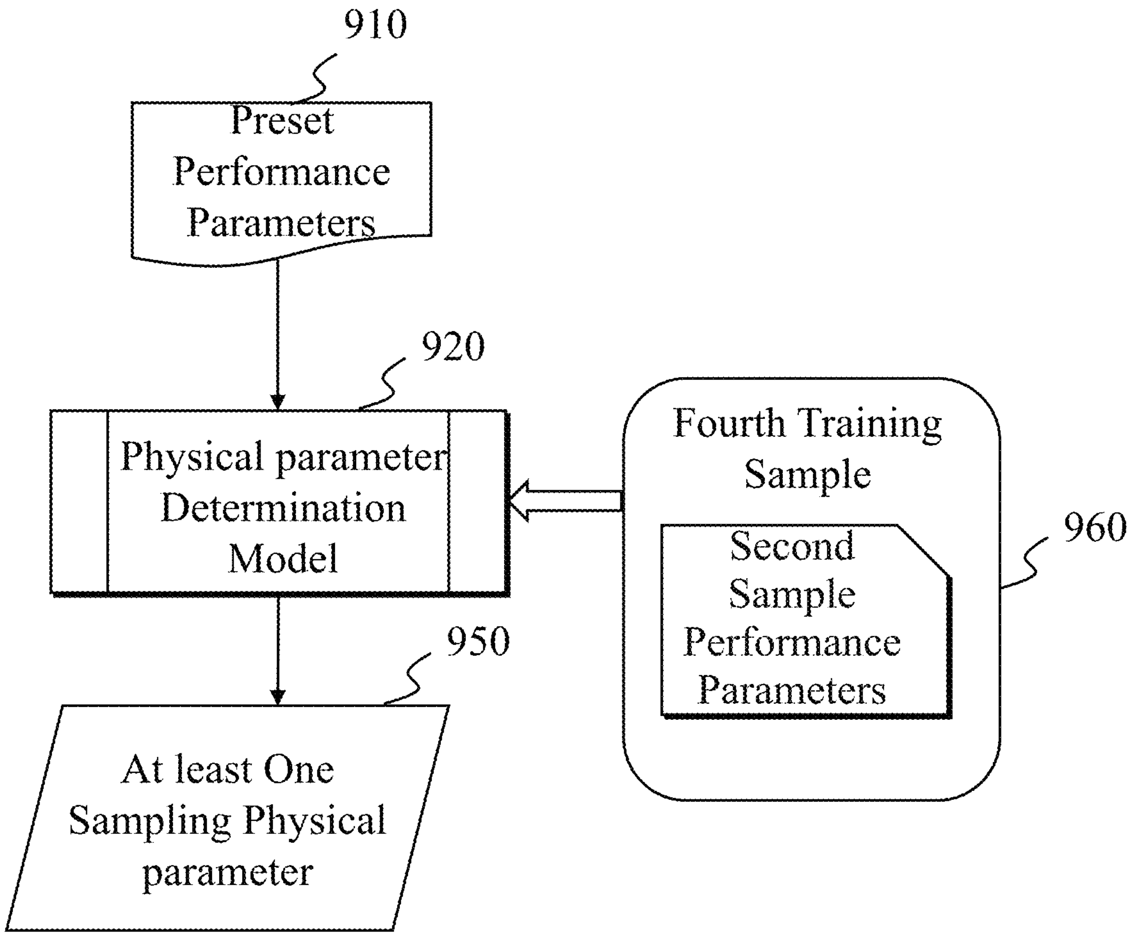
FIG. 9B is another schematic diagram illustrating a physical parameter determination model according to some embodiments of the present disclosure.

FIG. 9B is another schematic diagram illustrating a physical parameter determination model according to some embodiments of the present disclosure.

In some embodiments, at least one sampling physical parameter as an output of the physical parameter determination model is determined by inputting the preset performance parameters into the physical parameter determination model. As shown in FIG. 9B, inputs of the physical parameter determination model 920 may include the preset performance parameters 910, and the output may include the at least one sampling physical parameter 950. For example, after inputting the preset performance parameters 910 into the physical parameter determination model 920, the physical parameter determination model 920 may output the at least one sampling physical parameter 950 after the analytical process, the control device 300 may sample the at least one sampling physical parameter 950 through at least one stage of inner loop control circuit.

In some embodiments, as shown in FIG. 9B, the physical parameter determination model 920 may be obtained by a training process. The training process may include: obtaining a fourth training sample 960; and inputting the fourth training sample 960 into the initial physical parameter determination model to obtain the physical parameter determination model 920 by training. The fourth training sample 960 includes second sample performance parameters.

An exemplary training process may include: inputting the plurality of fourth training samples 960 with fourth labels into an initial physical parameter determination model, determining a value of a loss function by the fourth labels and the determination result of the initial physical parameter determination model, and iteratively updating the parameters of the initial physical parameter determination model based on the value of the loss function. The model training may be completed when the loss function of the initial physical parameter determination model satisfies the preset condition for terminating the training process, and the trained physical parameter determination model 920 may be obtained. The fourth training sample 960 may include the second sample performance parameters. The fourth training sample 960 may be determined based on performance parameters of a historical operation process of the control device of the high-voltage generator. The fourth labels may refer to at least one sampling physical parameter corresponding to the fourth training sample 960, which may be determined based on manual labeling or systematic automatic labeling. The preset condition for terminating the training process may be that the loss function converges (e.g., the mean square error of the loss function is less than the fourth error threshold), the count of iterations reaches the fourth count of iterations threshold, and the like.

Figure 10:
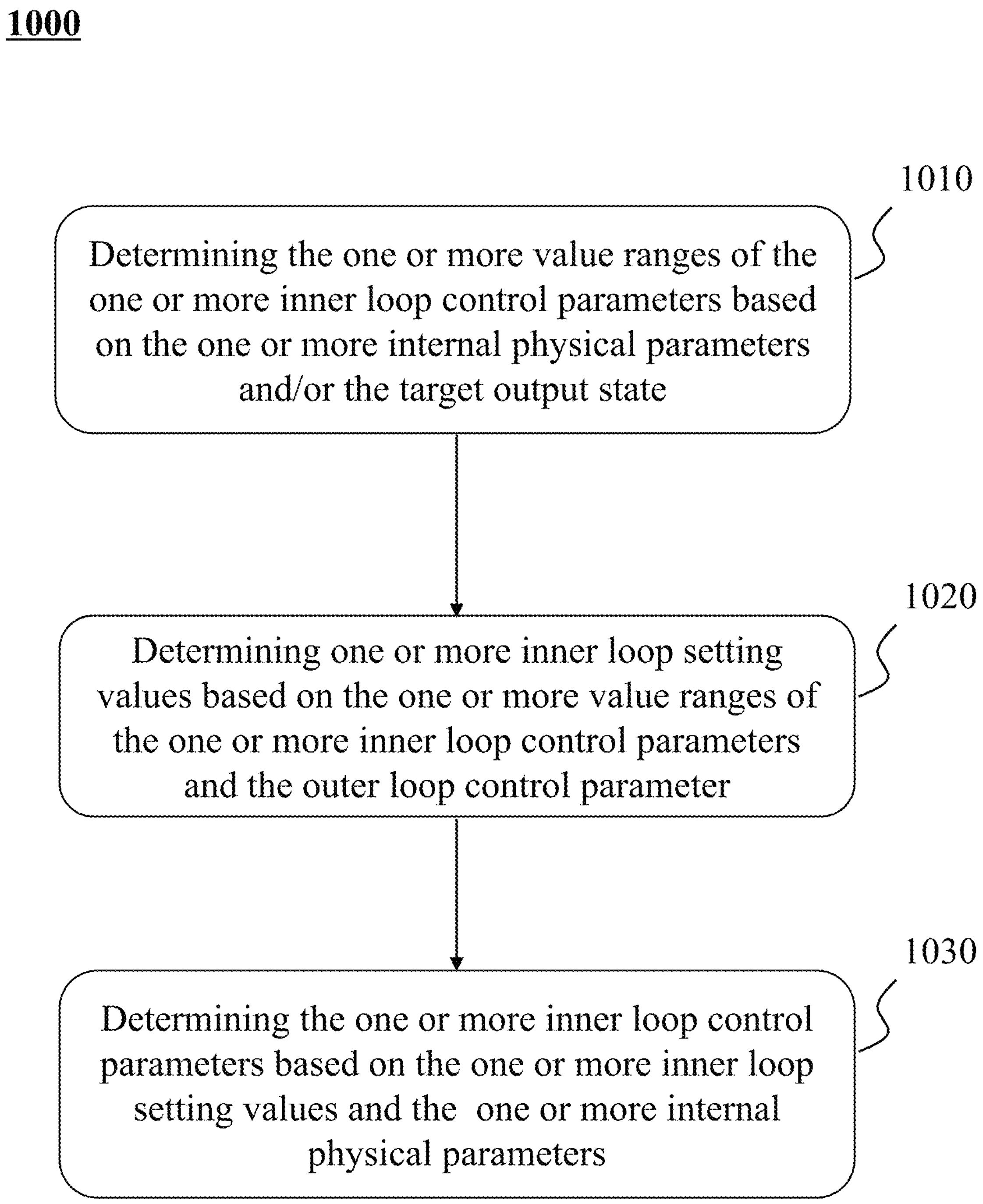
FIG. 10 is a flowchart illustrating an exemplary method for determining an inner loop control parameter according to some embodiments of the present disclosure.

FIG. 10 is a flowchart illustrating an exemplary process for determining an inner loop control parameter according to some embodiments of the present disclosure.

In some embodiments, process 1000 may be executed by the control device 300. The schematic diagram illustrating an operation of the process 1000 described below may be illustrative. In some embodiments, one or more additional operations not described and/or one or more operations not discussed may be used to complete the process. Further, the sequence of the operation of the process 1000 illustrated in FIG. 10 and described below is not intended to be limiting.

In 1010, one or more value ranges of the one or more inner loop control parameters may be determined based on the one or more internal physical parameters and/or the target output state. More descriptions of the value range of the inner loop control parameter may be found in FIG. 6 or FIG. 8 and the associated descriptions thereof.

For example, the first stage of the multiple stages of inner loop control circuits may be an outer loop control circuit, and the outer loop control circuit may obtain an outer loop control parameter based on a target output voltage and a sampled current output voltage through an outer loop computation. Then the first-stage inner loop control circuit (e.g., the first-stage inner loop control circuit) may be determined based on the target output voltage and/or the internal physical parameters $P_1$ by determining or looking up the preset table (i.e., a look-up table process), or a range determination model (e.g., a first-stage inner loop control circuit 320-1) corresponding to an upper limit value and/or a lower limit value of the inner loop control parameter. As another example, the upper limit value and/or the lower limit value of the inner loop control parameter corresponding to the second-stage inner loop control circuit (e.g., a second-stage inner loop control circuit 320-1) may be determined by determining or looking up the preset table (i.e., a look-up table process), or a range determination model based on the target output state and/or the internal physical parameter $P_2$.

In 1020, one or more inner loop setting values may be determined based on the one or more value ranges of the one or more inner loop control parameters and the outer loop control parameter. For example, the one or more inner loop setting values correspond one-to-one with the one or more inner loop control parameters.

For example, following the previous example, for the first-stage inner loop control circuit, after determining the value range of the inner loop control parameter, a first inner loop setting value $S_1$ of the first-stage inner loop control circuit may be determined based on the upper limit value and/or the lower limit value of the value range and the outer loop control parameter. For example, when the outer loop control parameter is within the value range of the inner loop control parameter of the first-stage inner loop control circuit, the outer loop control parameter may be determined as the first inner loop setting value $S_1$. When the outer loop control parameter is greater than the upper limit value of the inner loop control parameter of the first-stage inner loop control circuit, the upper limit value of the value range may be determined as the first inner loop setting value $S_1$. When the outer loop control parameter is less than the lower limit value of the inner loop control parameter of the first-stage inner loop control circuit, the lower limit value of the value range may be determined as the first inner loop setting value $S_1$.

In 1030, the one or more inner loop control parameters may be determined based on the one or more inner loop setting values and the one or more internal physical parameters.

For example, following the above example, the first-stage inner loop control circuit may obtain an output value (e.g., the first inner loop control parameter) of the first-stage inner loop control circuit based on the first inner loop setting value $S_1$ and a sampling physical parameter $P_1$ through the inner loop 1 computation.

For example, after performing the above example, the control device 300 may further determine an upper limit value and/or a lower limit value of an amplitude of the second-stage inner loop control circuit corresponding to the second-stage inner loop control circuit (e.g., the second-stage inner loop control circuit 320-2) based on the target output state or the internal physical parameter $P_2$ through a range determination model. The control device 300 may determine determining or look up the preset table (i.e., a look-up table process) and determine a second inner loop setting value $S_2$ of the second-stage inner loop control circuit. Similarly, an output value (e.g., the second inner loop control parameter) of the second-stage inner loop control circuit may be obtained based on the second inner loop setting value $S_2$ of the second-stage inner loop control circuit and the sampled value of the internal physical parameter $P_2$, and thereby obtaining a third inner loop setting value $S_3$ of the third-stage inner loop control circuit. The process may be repeated until an inner loop setting value $S_m$ corresponding to the $M^{th}$-stage inner loop control circuit is obtained. The $M^{th}$-stage inner loop control circuit may obtain an output value $O_m$ the $M^{th}$-stage inner loop control circuit based on the inner setting value $S_m$ and a sampled value of the internal physical parameter $P_n$. A switching tube driver generation module 330 may generate a control signal based on the output value $O_m$. The control signal may control the output of the high-voltage generator by controlling the connectivity or blocking of the switching tube in the high-voltage generator, thereby causing the high-voltage generator to reach the target steady state quickly.

When the high-voltage generator needs to switch from the current output state to the target output state, by limiting the lower limit of the inner loop control parameter, it is possible to switch the high-voltage generator from the current output state to the target output state quickly. By limiting the upper limit value of the inner loop control parameter, it may be avoided that the rising speed is too fast and exceeds a standard value (for example, a parallel resonant peak), resulting in circuit runaway, thereby protecting the stress, such as the voltage and current, of the internal key points of the high voltage generator. At the same time, by limiting the values of multiple stages of inner loop control circuits corresponding to a plurality of inner loop control parameters, it is possible to make the rising time of the output values corresponding to each control circuit consistent or basically consistent, so that the trajectory of the output voltage is within the expectation.

Figure 11:
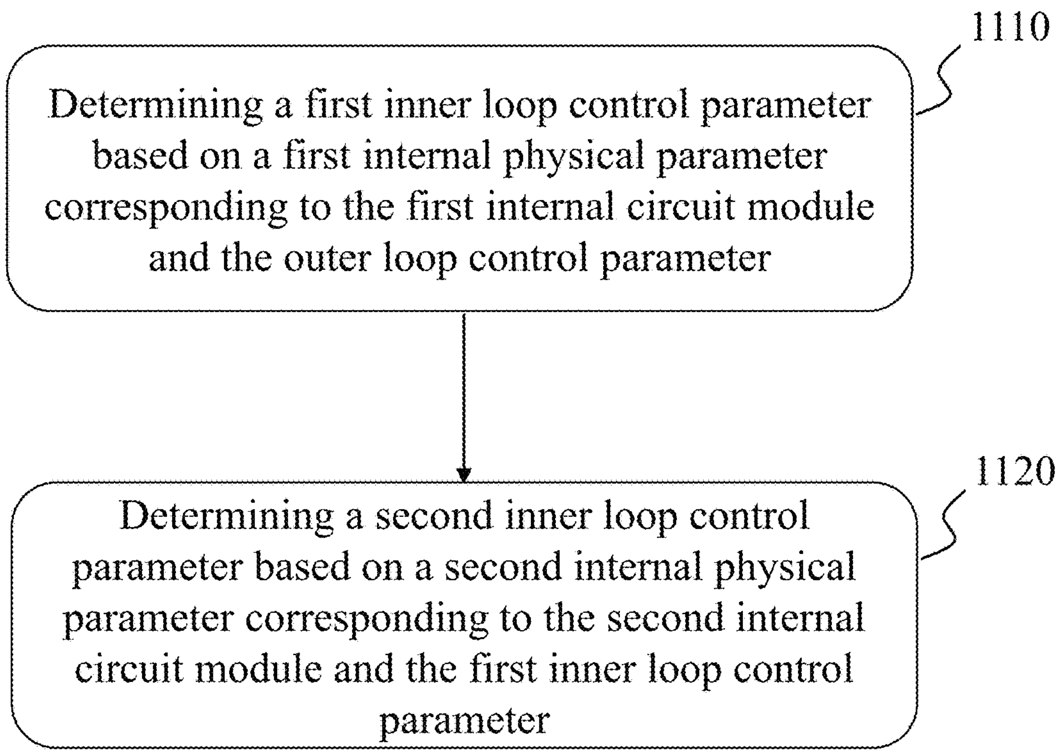
FIG. 11 is a flowchart illustrating another exemplary inner loop control parameter determination method according to some embodiments of the present disclosure.

FIG. 11 is a flowchart illustrating another exemplary inner loop control parameter determination process according to some embodiments of the present disclosure.

In some embodiments, process 1100 may be executed by the control device 300. The schematic diagram illustrating the operation of the process 1100 described below may be illustrative. In some embodiments, one or more additional operations not described and/or one or more operations not discussed may be used to complete the process. Further, the sequence of the operation of process 1100 illustrated in FIG. 11 and described below is not intended to be limiting.

In 1110, a first inner loop control parameter may be determined based on a first internal physical parameter corresponding to the first internal circuit module and the outer loop control parameter.

Merely by way of example, for example, based on the control device 300 as shown in FIG. 4A, the outer loop control circuit may obtain the outer loop control parameter based on the target output voltage and the sampling obtained current output voltage through an outer loop computation. An upper limit value and a lower limit value of an amplitude corresponding to the first-stage inner loop control circuit 420-1 may be determined based on the target output voltage or the internal physical parameter $P_1$ by determining or looking up the preset table or based on the range determination model, thereby determining the first inner loop setting value $S_1$ of the first-stage inner loop control circuit 420-1 based on the upper limit value and/or the lower limit value and the outer loop control parameter. The first-stage inner loop control circuit 420-1 may obtain an output value (e.g., a first inner loop control parameter) of the first-stage inner loop control circuit based on the first inner loop setting value $S_1$ and the sampled value of the internal physical parameter $P_1$ by the inner loop 1 computation.

In 1120, a second inner loop control parameter may be determined based on a second internal physical parameter corresponding to the second internal circuit module and the first inner loop control parameter.

Merely by way of example, after performing the above example, the control device 300 may further determine the second inner loop setting value $S_2$ of the second-stage inner loop control circuit 420-2 by determining or looking up the preset table or determining the upper limit value and/or the lower limit value of the amplitude corresponding to the second-stage inner loop control circuit 420-2 based on the target output state or the internal physical parameter $P_2$. Similarly, based on the second inner loop setting value $S_2$ of the second-stage inner loop control circuit 420-2 and the sampled value of the internal physical parameter $P_2$, an output value (e.g., the second inner loop control parameter) of the second-stage inner loop control circuit may be obtained, and the switching tube driver generation module 330 may generate a control signal (e.g., a closed loop control parameter) based on the second inner loop control parameter. The control signal may control the output of the high-voltage generator by controlling the connectivity or blocking of the switching tube in the high-voltage generator, thereby causing the high-voltage generator to reach the target steady state quickly.

As shown in FIG. 11, taking the control device and two stages of inner loop control circuits respectively connected to two internal circuit modules as an example, when the control device includes multiple stages of inner loop control circuits respectively connected to a plurality of internal circuit modules (e.g., the control device shown in FIG. 4A), a third inner loop control parameter of a third internal circuit module may be further determined based on a third internal physical parameter and the second inner loop control parameter of the third internal circuit module, and the operation may be repeated until an inner loop control parameter corresponding to the last internal circuit module is obtained.

In some embodiments, each stage of control circuit (e.g., the outer loop control circuit and the inner loop control circuit), after loop computation, may be connected to a set of value range processing modules (e.g., a determination or looking up the preset table or a limiting module) for determining a corresponding setting value. For example, the outer loop control circuit 310, the first-stage inner loop control circuit 320-1, the second-stage inner loop control circuit 320-2, . . . , and the m−1th-stage inner loop control circuit 320-($m$−1), after the loop computation, may all be connected to a set of value range processing modules for determining the corresponding setting values for each stage of inner loop control circuits, respectively.

It should be noted that the above description of the process 1000 and the process 1100 is merely provided for the purpose of illustrating and is not intended to limit the scope of the present disclosure. For those skilled in the art, a wide variety of amendments and variations may be made based on the description of the present disclosure. However, these amendments and variations do not depart from the scope of the present disclosure.

The beneficial effects of the present disclosure embodiments may include, but are not limited to: by limiting the upper limit and lower limit of the reference value of each stage of the control circuit, voltage and current stresses at a plurality of critical points inside the high-voltage generator may be protected, and at the same time, a good dynamic performance may be presented. It should be noted that different embodiments may have different beneficial effects, and in different embodiments, the beneficial effects that may be generated may be any one or a combination of several of the above, and may also be any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing parameters or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized according to the teachings herein. Accordingly, embodiments of the present application are not limited to that precisely as shown and described.

What is claimed is:

1. A method for controlling a high voltage generator, comprising:

obtaining a current output voltage and a target output voltage of the high voltage generator;

determining an outer loop control parameter based on the current output voltage and the target output voltage;

obtaining one or more internal physical parameters of the high voltage generator, wherein the one or more internal physical parameters correspond to at least one internal circuit module of the high voltage generator;

determining one or more inner loop control parameters based on the one or more internal physical parameters and the outer loop control parameter, wherein one or more value ranges of the one or more inner loop control parameters are dynamically determined based on the one or more internal physical parameters or a target output state; and determining a closed loop control parameter based on the one or more inner loop control parameters to control the high voltage generator.

2. The method of claim 1, wherein each of the one or more value ranges of the one or more inner loop control parameters includes an upper limit value of an inner loop control parameter or a lower limit value of the inner loop control parameter; and the upper limit value or the lower limit value of the inner loop control parameter is determined based on a time-varying value trajectory.

3. The method of claim 2, wherein the determining the one or more value ranges of the one or more inner loop control parameters includes:

determining the one or more value ranges of the one or more inner loop control parameters based on a preset relationship between the one or more value ranges and the one or more inner loop control parameters or a preset relationship between the one or more value ranges and the target output state.

4. The method of claim 2, wherein the determining the one or more value ranges of the one or more inner loop control parameters includes:

determining the one or more value ranges using a range determination model based on the one or more internal physical parameters or the target output state;

wherein an input of the range determination model includes the one or more internal physical parameters or the target output state, and an output of the range determination model includes the one or more value ranges corresponding to the one or more inner loop control parameters.

5. The method of claim 2, wherein a trajectory line of the lower limit value is configured to improve a dynamic performance to enable fast switching from a current output state to the target output state, and a trajectory line of the upper limit value is configured to protect a voltage and a current at key points inside the high-voltage generator to protect against stress.

6. The method of claim 1, wherein the determining the one or more inner loop control parameters based on the one or more internal physical parameters and the outer loop control parameter includes:

determining the one or more value ranges of the one or more inner loop control parameters based on the one or more internal physical parameters or the target output state;

determining one or more inner loop setting values based on the one or more value ranges of the one or more inner loop control parameters and the outer loop control parameter; and determining the one or more inner loop control parameters based on the one or more inner loop setting values and the one or more internal physical parameters.

7. The method of claim 1, wherein the at least internal circuit module includes a plurality of internal circuit modules, at least one stage of inner loop control circuit and the plurality of internal circuit modules are coupled, and the at least one stage of inner loop control circuit is configured to sample at least one internal physical parameter of the one or more internal physical parameters corresponding to the plurality of internal circuit modules.

8. The method of claim 1, wherein a plurality of inner loop control circuits is sequentially connected in series to form multiple stages of inner loop control circuits; wherein each of the multiple stages of inner loop control circuits is coupled and connected to one or more of the at least one internal circuit module, respectively, and the each of the plurality of inner loop control circuits is configured to sample at least one internal physical parameter corresponding to the one or more of the at least one internal circuit module that is connected to the each of the plurality of inner loop control circuits.

9. The method of claim 8, wherein the multiple stages of inner loop control circuits include a first-stage inner loop control circuit coupled to a first internal circuit module and a second-stage inner loop control circuit coupled to a second internal circuit module, the determining the one or more inner loop control parameters based on the one or more internal physical parameters and the outer loop control parameter includes:

determining a first inner loop control parameter based on a first internal physical parameter corresponding to the first internal circuit module and the outer loop control parameter; and determining a second inner loop control parameter based on a second internal physical parameter corresponding to the second internal circuit module and the first inner loop control parameter;

wherein the determining the closed loop control parameter based on the one or more inner loop control parameters includes:

determining the closed loop control parameter based on the second inner loop control parameter.

10. The method of claim 8, wherein when at least one stage of inner loop control circuit of the multiple stages of inner loop control circuits is coupled to a first internal circuit module and a second internal circuit module of the high voltage generator, the determining the one or more inner loop control parameters based on the one or more internal physical parameters and the outer loop control parameter includes:

determining a target physical parameter based on a first internal physical parameter corresponding to the first internal circuit module and a second internal physical parameter corresponding to the second internal circuit module; and determining an inner loop control parameter corresponding to the target physical parameter based on the target physical parameter and the outer loop control parameter.

11. The method of claim 8, further comprising:

determining one or more of the at least one internal circuit module connected to each stage of inner loop control circuit of the multiple stages of inner loop control circuits using a circuit module determination model based on the multiple stages of inner loop control circuits and the one or more of the at least one internal circuit module.

12. The method of claim 1, further comprising:

determining a sampling physical parameter using a trained physical parameter determination model based on a preset condition.

13. The method of claim 12, wherein the preset condition includes preset performance parameters, and the determining the sampling physical parameter using the trained physical parameter determination model includes:

determining physical parameters by inputting the preset performance parameters into the trained physical parameter determination model; and determining the sampling physical parameter based on the physical parameters.

14. The method of claim 13, wherein the physical parameters include at least one of: a type of an internal physical parameter of the one or more internal physical parameters, a sequence of determination of the one or more internal physical parameters, or a sampling scheme corresponding to each of the one or more internal physical parameters.

15. The method of claim 1, wherein the at least one internal circuit module of the high voltage generator includes an inverter circuit, a resonance network, a voltage converter circuit, or a rectifier filter circuit that are connected in sequence, and the one or more internal physical parameters includes at least one of:

an inverter current, an inverter input current, a voltage difference between bridge arms of the inverter circuit, a voltage of a series resonance capacitor of the resonance network, a primary voltage of the voltage converter circuit, or an output current of the high voltage generator.

16. A control device of a high voltage generator, comprising:

an outer loop control circuit, wherein an input end of the outer loop control circuit is connected to an output end of the high voltage generator, and the outer loop control circuit is configured to sample a current output voltage of the high voltage generator, and determine an outer loop control parameter based on the current output voltage and a target output voltage;

at least one stage of inner loop control circuit, wherein a first input of the at least one stage of inner loop control circuit is connected to at least one internal circuit module of the high voltage generator, a second input of a first stage of inner loop control circuit in the at least one stage of inner loop control circuit is connected to the outer loop control circuit, a second input of any inner loop control circuit other than the first stage of inner loop control circuit is connected to a previous stage of inner loop control circuit;

the at least one stage of inner loop control circuit is configured to sample one or more internal physical parameters corresponding to the at least one internal circuit module, and determine one or more inner loop control parameters corresponding to the at least one internal circuit module based on the one or more internal physical parameters and the outer loop control parameter; wherein one or more value ranges of the one or more inner loop control parameters is dynamically determined using a range determination model based on the one or more internal physical parameters or the target output state, an input of the range determination model includes the one or more internal physical parameters or the target output state, and an output of the range determination model includes the one or more value ranges corresponding to the one or more inner loop control parameters;

wherein the control device is configured to determine a closed loop control parameter based on the one or more inner loop control parameters to control the high voltage generator.

17. The device of claim 16, wherein the at least one internal circuit module includes a plurality of internal circuit modules, at least one stage of inner loop control circuit and the plurality of internal circuit modules are coupled, and the at least one stage of inner loop control circuit is configured to sample at least one internal physical parameter of the one or more internal physical parameters corresponding to the plurality of internal circuit modules.

18. The device of claim 16, the at least one stage of inner loop control circuit comprising multiple stages of inner loop control circuits that are sequentially connected in series; wherein each of the multiple stages of inner loop control circuits is coupled and connected to one or more of the at least one internal circuit module, respectively, to sample at least one internal physical parameter corresponding to the one or more of the at least one internal circuit module.

19. The device of claim 16, further comprising:

the at least one internal circuit module of the high voltage generator includes an inverter circuit, a resonance network, a voltage converter circuit, or a rectifier filter circuit that are connected in sequence, and the one or more internal physical parameters includes at least one of:

an inverter current, an inverter input current, a voltage difference between bridge arms of the inverter circuit, a voltage of a series resonance capacitor of the resonance network, a primary voltage of the voltage converter circuit, or an output current of the high voltage generator.

20. A non-transitory computer-readable storage medium for storing computer instructions, wherein a processor, when performing at least a portion of the computer instructions, implement a method comprising:

obtaining a current output voltage and a target output voltage of the high voltage generator;

determining an outer loop control parameter based on the current output voltage and the target output voltage;

obtaining one or more internal physical parameters of the high voltage generator, wherein the one or more internal physical parameters correspond to at least one internal circuit module of the high voltage generator;

determining one or more inner loop control parameters based on the one or more internal physical parameters and the outer loop control parameter, wherein one or more value ranges of the one or more inner loop control parameters are dynamically determined based on the one or more internal physical parameters or a target output state; and determining a closed loop control parameter based on the one or more inner loop control parameters to control the high voltage generator.

* * * * *